(12) United States Patent
Wakashiro et al.

(10) Patent No.: US 6,550,557 B2
(45) Date of Patent: Apr. 22, 2003

(54) CONTROL APPARATUS FOR HYBRID VEHICLE

(75) Inventors: Teruo Wakashiro, Wako (JP); Kazutomo Sawamura, Wako (JP); Shinichi Kitajima, Wako (JP); Hideyuki Takahashi, Wako (JP); Katsuhiro Kumagai, Wako (JP); Fumihiko Konno, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 78 days.

(21) Appl. No.: 09/737,428

(22) Filed: Dec. 18, 2000

(65) Prior Publication Data

US 2001/0004029 A1 Jun. 21, 2001

(30) Foreign Application Priority Data

Dec. 20, 1999 (JP) .............................. 11-361918

(51) Int. Cl.$^7$ ................................................ H02P 3/14
(52) U.S. Cl. ...................... 180/65.2; 180/170
(58) Field of Search .................. 180/170, 65.2, 180/65.3, 65.4, 65.8; 201/22

(56) References Cited

U.S. PATENT DOCUMENTS

| | | | |
|---|---|---|---|
| 6,140,780 A | * 10/2000 | Oshima et al. | 180/65.2 |
| 6,216,465 B1 | * 4/2001 | Wakashiro et al. | 180/65.2 |
| 6,329,775 B1 | * 12/2001 | Matsubara et al. | 180/65.2 |
| 6,343,246 B1 | * 1/2002 | Matsubara et al. | 180/65.1 |
| 6,362,536 B1 | * 3/2002 | Izumiura et al. | 180/65.2 |
| 6,430,482 B1 | * 8/2002 | Wakashiro et al. | 701/22 |

FOREIGN PATENT DOCUMENTS

| | | |
|---|---|---|
| DE | 197 18 709 A1 | 11/1997 |
| JP | 7-123509 | 5/1995 |
| JP | 9-175203 | 7/1997 |
| JP | 10-4608 | 1/1998 |
| JP | 11-289608 | 10/1999 |
| JP | 11-301308 | 11/1999 |

* cited by examiner

Primary Examiner—Brian L. Johnson
Assistant Examiner—J. Allen Shriver
(74) Attorney, Agent, or Firm—Armstrong, Westerman & Hattori, LLP

(57) ABSTRACT

A control apparatus provided in a hybrid vehicle having a combustion engine for outputting a driving force, an electric motor for generating a force for assisting the output from the engine, depending on the driving conditions, a power storage unit for storing electric energy generated by the motor acting as a generator using the output from the engine and electric energy regenerated by the motor when the vehicle decelerates. The control apparatus includes: a speed limiter for decreasing the driving force produced by the motor when the vehicle speed exceeds a first threshold value while the engine and the motor produce the driving force; a generation starter for starting generation by the motor when the vehicle speed exceeds a second threshold value which is higher than the first threshold value; and a generation amount setting device for setting the amount of generation, depending on the driving conditions of the vehicle, when the generation starter starts the generation. The motor generates the electric energy, depending on the amount of generation set by the generation amount setting device.

6 Claims, 20 Drawing Sheets

MTHHAST TABLE

PB ASSIST TRIGGER TABLE

LOOK-UP OF THCRSPNH/L IN TABLE DEPENDING ON NE (n=5)

INTERPOLATION OF KTHCRSRN DEPENDING ON THCRSRN

CONTROL APPARATUS FOR HYBRID VEHICLE

BACKGROUND OF THE INVENTION

1. Field of the Invention

The present invention relates to a control apparatus for a hybrid vehicle which can optimize energy management when the vehicle is driving at a high speed.

2. Description of the Related Art

Conventionally, hybrid vehicles are well-known which have electric motors as power sources for driving the vehicles in addition to engines.

In conventional hybrid vehicles, there are parallel hybrid vehicles which use motors as assisting driving sources for assisting the output from the engines. Parallel hybrid vehicles assist the output from the engine by the motor when the vehicle accelerates, charge the battery by deceleration regeneration when the vehicle decelerates, and perform various controls, to respond the driver's demands while maintaining the remaining charge (electric energy) of the battery (as disclosed in Japanese Unexamined Patent Application, First Publication No. Hei 7-123509).

When a conventional hybrid vehicle is accelerating, the motor assists the output from the engine. The assistance of the output from the engine by the motor is maintained even when the vehicle is driving at a high speed when the fuel supply to the engine is stopped by a limiter. In this case, even though the engine is controlled to decelerate the vehicle, the motor is controlled to assist the driving power from the engine, thus causing inconsistencies in the controls.

The unnecessary assistance by the motor decreases the remaining charge of the battery, causing problems in energy management.

For example, the vehicle drives at a high speed while stopping the fuel supply, the vehicle then decelerates, and the motor enters a deceleration mode to perform regeneration. In this case, the deceleration may be excessive, and the driver may experience a feeling of unease.

SUMMARY OF THE INVENTION

It is therefore an object of the present invention to provide a control apparatus for a hybrid vehicle which restricts the assistance of the engine by the motor, and which appropriately controls electric generation.

In a first aspect of the present invention, the control apparatus is provided in a hybrid vehicle with a combustion engine (E) for outputting a driving force, an electric motor (M) for generating a force for assisting the output from the engine, depending on the driving conditions, a power storage unit (battery 3) for storing electric energy generated by the motor acting as a generator using the output from the engine and electric energy regenerated by the motor when the vehicle decelerates. The control apparatus includes: a speed limiter (step S100A) for decreasing the driving force produced by the motor when the vehicle speed exceeds a first threshold value (assist trigger look-up upper limit vehicle speed #VMASTHG) while the engine and the motor produce the driving force; a generation starter (step S100B) for starting generation by the motor when the vehicle speed exceeds a second threshold value (the high vehicle speed VASTVHG, shown in FIG. 15, at which the assistance is zero) which is higher than the first threshold value; and a generation amount setting device (step S250) for setting the amount of generation, depending on the driving conditions of the vehicle, when the generation starter starts the generation. The motor generates the electric energy, depending on the amount of generation set by the generation amount setting device.

When the vehicle speed exceeds the first threshold value, the unnecessary driving force is decreased. Further, when the vehicle speed exceeds the second threshold value, the motor starts the generation to restrict the increase of the vehicle speed.

That is, as compared with the case where the fuel supply to the engine is suddenly stopped, the feeling of unease felt by the driver is reduced.

In a second aspect of the present invention, the speed limiter decreases the driving force produced by the motor after the vehicle speed exceeds the first threshold value until the vehicle speed reaches the second threshold value, and makes the motor stop the production of the driving force when at the second threshold value.

When at the second threshold value, the motor stops producing the driving force, and can continuously start the generation.

That is, once the motor stops producing the driving force, the motor smoothly starts the generation, thereby preventing the driver from experiencing the feeling of unease.

In a third aspect of the present invention, the control apparatus includes a fuel supply stopper for repeating stopping of the supply of fuel at a predetermined interval when the vehicle speed reaches a fourth threshold value which is higher than the second threshold value.

The control apparatus can reliably decrease the vehicle speed even the braking by stopping the assistance for the engine while starting the generation by the motor is insufficient.

Therefore, the energy is not unnecessarily consumed when the vehicle is driving at a high speed, thereby reducing the fuel consumption.

In a fourth aspect of the present invention, the generation amount setting device sets the amount of generation, depending on the degree of throttle opening, when the vehicle speed exceeds a third threshold value which is higher than the second threshold value and lower than the fourth threshold value.

When decelerating the vehicle by the generation by the motor, the amount of generation can be adjusted by the generation amount setting device, depending on the degree of the throttle opening indicating the driver's intention.

Once the motor starts the generation, the amount of generation is set depending on the degree of throttle opening. Therefore, the vehicle decelerates depending on the depression of the accelerator pedal by the driver, and this prevents the driver from experiencing a feeling of unease. As the result, the energy management can be optimized, and the commercial value of the vehicle is increased.

DETAILED DESCRIPTION OF THE INVENTION

The embodiment of the control apparatus for the hybrid vehicle of the present invention will be explained with reference to the figures.

The hybrid vehicle is a parallel hybrid vehicle. Driving forces from both an engine E and a motor M are transmitted via a transmission T of an automatic or manual transmission, to front wheels Wf which are the drive wheels. When the hybrid vehicle decelerates and the driving force is transmitted from the front wheels Wf to the motor M, the motor M acts as a generator to generate what is termed a regenerative braking force, so that the kinetic energy of the vehicle body is stored as electric energy. Reference symbol Wr denotes rear wheels.

A power drive unit 2 performs the driving and regeneration of the motor M in response to control commands from a motor ECU 1. A high-voltage battery 3 for sending and receiving electric energy to and from the motor M is connected to the power drive unit 2. The battery 3 includes a number of modules connected in series, each module having a number of cells connected in series. The hybrid vehicle includes a 12-volt auxiliary battery 4 for driving various accessories. The auxiliary battery 4 is connected to the battery 3 via a downverter 5. The downverter 5, controlled by an FIECU 11, reduces the voltage from the battery 3 and charges the auxiliary battery 4.

Figure 1:
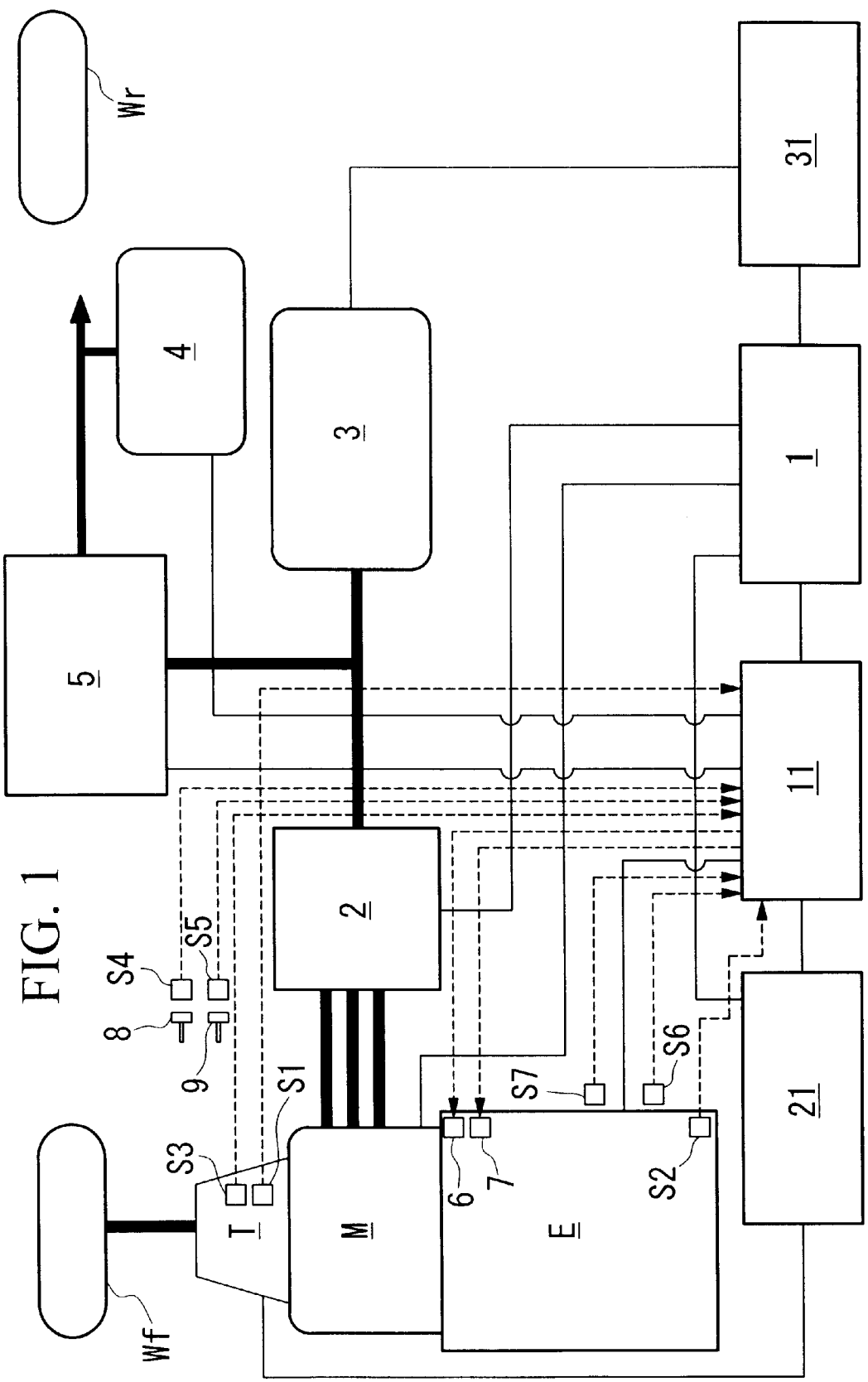
FIG. 1 is a diagram showing the structure of the hybrid vehicle with the control system of the present invention.

The FIECU 11 controls, in addition to the motor ECU 1 and the downverter 5, a fuel supply amount controller 6 for controlling the amount of fuel supplied to the engine E, a starter motor 7, an ignition timing, etc. Therefore, the FIECU 11 receives a signal from a speed sensor S1 for detecting the vehicle speed V based on the rotation of the driving shaft of the transmission, a signal from an engine rotational speed sensor S2 for detecting the engine rotational speed NE, a signal from a shift position sensor S3 for detecting the shift position of the transmission T, a signal from a brake switch S4 for detecting operation of a brake pedal 8, a signal from a clutch switch S5 for detecting operation of a clutch pedal 9, a signal from a throttle valve opening sensor S6 for detecting the degree of throttle opening TH (throttle opening state), and a signal from an air intake passage pressure sensor S7 for detecting the air intake passage pressure PB. In FIG. 1, reference numeral 21 denotes a CVTECU for controlling the CVT (Continuous Variable Transmission), and reference numeral 31 denotes a battery ECU for protecting the battery 3 and calculating the state of charge (remaining charge) SOC of the battery 3.

Motor Operation Mode Determination

The control modes of the hybrid vehicle are the "idle mode", "idle stop mode", "deceleration mode", "acceleration mode", and "cruise mode." In the idle mode, the fuel supply is stopped, and is restarted to maintain the engine in the idling state. In the idle stop mode, the engine is stopped under specific conditions, e.g., when the vehicle stops. In the deceleration mode, the motor M performs the regenerative braking. In the acceleration mode, the motor assists the engine. In the cruise mode, the motor is not driven, and the vehicle is driven only by the driving force produced by the engine.

The motor operation determination mode for determining the mode will be explained with reference to the flowcharts of FIGS. 3 and 4.

In step S001, it is determined whether an MT/CVT determination flag F_AT is 1. When this determination is NO, that is, when the vehicle is an MT vehicle, the flow proceeds to step S002. When in step S001 the determination is YES, that is, when the vehicle is a CVT vehicle, the flow proceeds to step S010, and it is then determined whether the CVT in-gear determination flag F_ATNP is 1. When in step S010 the determination is NO, that is, when in the in-gear state, the flow proceeds to step S010A, and it is then determined, based on a switch back determination flag F_VSWB, whether the vehicle is being switched back (the shift lever is being operated). When the vehicle is being switched back, the flow proceeds to step S022, enters the idling mode, and the control terminates. In the idling mode, the fuel supply is stopped, and is then restarted, and the idling of the engine E is continued. When in step S010A the vehicle is not being switched back, the flow proceeds to step S004.

When in step S010 the determination is YES, that is, when in the N-(neutral) or P-(parking) position, the flow proceeds to step S014, and it is determined whether the engine stop control execution flag F_FCMG is 1. When in step S014 this determination is NO, the flow enters the idling mode in step S022, and the control terminates. When in step S014 the flag is 1, the flow proceeds to step S023, and enters idling stop mode, and the control terminates. In the idling stop mode, the engine E is stopped under specified conditions e.g., when the hybrid vehicle is stopped.

In step S002, it is determined whether the neutral position determination flag F_NSW is 1. When in step S002 the determination is YES, that is, when in the neutral position, the flow proceeds to step S014. When in step S002 the determination is NO, that is, when in the in-gear state, the flow proceeds to step S003, and it is determined whether a clutch engagement determination flag F_CLSW is 1. When the determination is YES, that is, when the clutch is disengaged, the flow proceeds to step S014. When in step S003 the determination is NO, that is, when the clutch is engaged, the flow proceeds to step S004.

In step S004, it is determined whether the IDLE determination flag F_THIDLMG is 1. When this determination is NO, that is, when the throttle is completely closed, the flow proceeds to step S011. When in step S004 the determination is YES, that is, when the throttle is not completely closed, the flow proceeds to step S005, and it is determined whether the motor assistance determination flag F_MAST is 1.

When in step S005 the determination is NO, the flow proceeds to step S011. When in step S005 the determination is YES, the flow proceeds to step S006.

In step S011, it is determined whether the MT/CVT determination flag F_AT is 1. When the determination is NO, that is, when the vehicle is an MT vehicle, the flow proceeds to step S013. When in step S011 the determination is YES, that is, when the vehicle is a CVT vehicle, the flow proceeds to step S012, and it is determined whether the reverse position determination flag F_ATPR is 1. When this determination is YES, that is, when in the reverse position, the flow proceeds to step S022. When the determination is NO, that is, when in other than the reverse position, the flow proceeds to step S013.

In step S006, it is determined whether the MT/CVT determination flag F_AT is 1. When this determination is NO, that is, when the vehicle is an MT vehicle, it is determined in step S008 whether a final charging command value REGENF is equal to or below zero. When the value is equal to or below zero, the flow proceeds to the acceleration mode in step S009, and the control terminates. When in step S008 the REGENF is above zero, the control terminates.

When in step S006 the determination is YES, that is, the vehicle is a CVT vehicle, the flow proceeds to step S007, and it is determined whether a brake ON determination flag F_BKSW is 1. When in step S007 this determination is YES, that is, when the driver is depressing the brake, the flow proceeds to step S013. When in step S007 the determination is NO, that is, when the driver is not depressing the brake, the flow proceeds to step S008.

In step S013, it is determined whether the vehicle speed VP for the engine control is zero. When this determination is YES, that is, when the vehicle speed VP is zero, the flow proceeds to step S014. When in step S013 the determination is NO, that is, when the vehicle speed VP is not zero, the flow proceeds to step S015. In step S015, it is determined whether an engine stop control execution flag F_FCMG is 1. When in step S015 the determination is NO, the flow proceeds to step S016. When in step S015 the flag is 1, the flow proceeds to step S023.

In step S016, the vehicle speed VP for the engine control is compared with a deceleration mode braking determination lower vehicle speed #VRGNBK. The #VRGNBK has hysteresis.

When in step S016 the vehicle speed VP≦the deceleration mode braking determination lower vehicle speed #VRGNBK, the flow proceeds to step S019. When in step S016 the VP>#VRGNBK, the flow proceeds to step S017.

In step S017, it is determined whether the brake ON determination flag F_BKSW is 1. When in step S017 the determination is YES, that is, the driver is depressing the brake, the flow proceeds to step S018. When in step S017 the determination is NO, that is, the driver is not depressing the brake, the flow proceeds to step S019.

In step S018, it is determined whether the IDLE determination flag F_THIDLMG is 1. When this determination is NO, that is, when the throttle is completely closed, the flow proceeds to step S024, and enters the deceleration mode, and the control terminates. In the deceleration mode, the regenerative braking by the motor M is performed. When in step S018 the determination is YES, that is, when the throttle is not completely closed, the flow proceeds to step S019.

In step S019, it is determined whether a deceleration fuel supply cut execution flag F_MADECFC is 1. The flag is used to determine whether to stop the fuel supply in a special mode in a high speed range described below.

When in step S019 the determination is YES, that is, when the fuel supply is stopped because the vehicle is decelerating, the flow proceeds to step S024. When in step S019 the determination is NO, the flow proceeds to step S020, a final assistance command value ASTPWRF is decreased, and in step S021 it is determined whether the final assistance command value ASTPWRF is equal to or below zero. When the value is equal to or below zero, the flow proceeds to step S025, and enters the cruise mode. In the cruise mode, the hybrid vehicle travels by the driving force produced by the engine E without assistance by the motor M. Further, the motor M regenerates the power, or acts as a generator to charge the battery 3, depending on the driving condition of the vehicle. When in step S021 the ASTPWRF is above zero, the control terminates.

Zoning of State of Charge (SOC)

The zoning of the state of charge (also referred to as the "remaining charge" or SOC) (dividing the remaining charge into zones), which significantly affects the entry into the assist trigger determination, and the cruise mode, will be explained. The calculation of the SOC is carried out by the battery ECU 31 of the hybrid vehicle 10, based on, i.e., the voltage, the discharged current, or the temperature.

In this example, zone A (from 40% to 80 or 90% of SOC), which is the normal use zone, is defined as the standard.

Zone B (from 20% to 40% of SOC), which is a temporary use zone, is below zone A, and zone C (from 0% to 20% of SOC), which is an over-discharge zone, is below zone B. Zone D (from 80% or 90% to 100% of SOC), which is an overcharge zone, is above zone A.

The SOC is calculated by integrating the current when in zones A and B, and is calculated based on voltages when in zones C and D, taking into consideration the characteristics of the battery. The boundaries between zones A, B, C, and D have upper and lower threshold values. The threshold values when the SOC is increasing are chosen to differ from those when the SOC is decreasing so as to cause hysteresis.

Assist Trigger Determination

Figure 3:
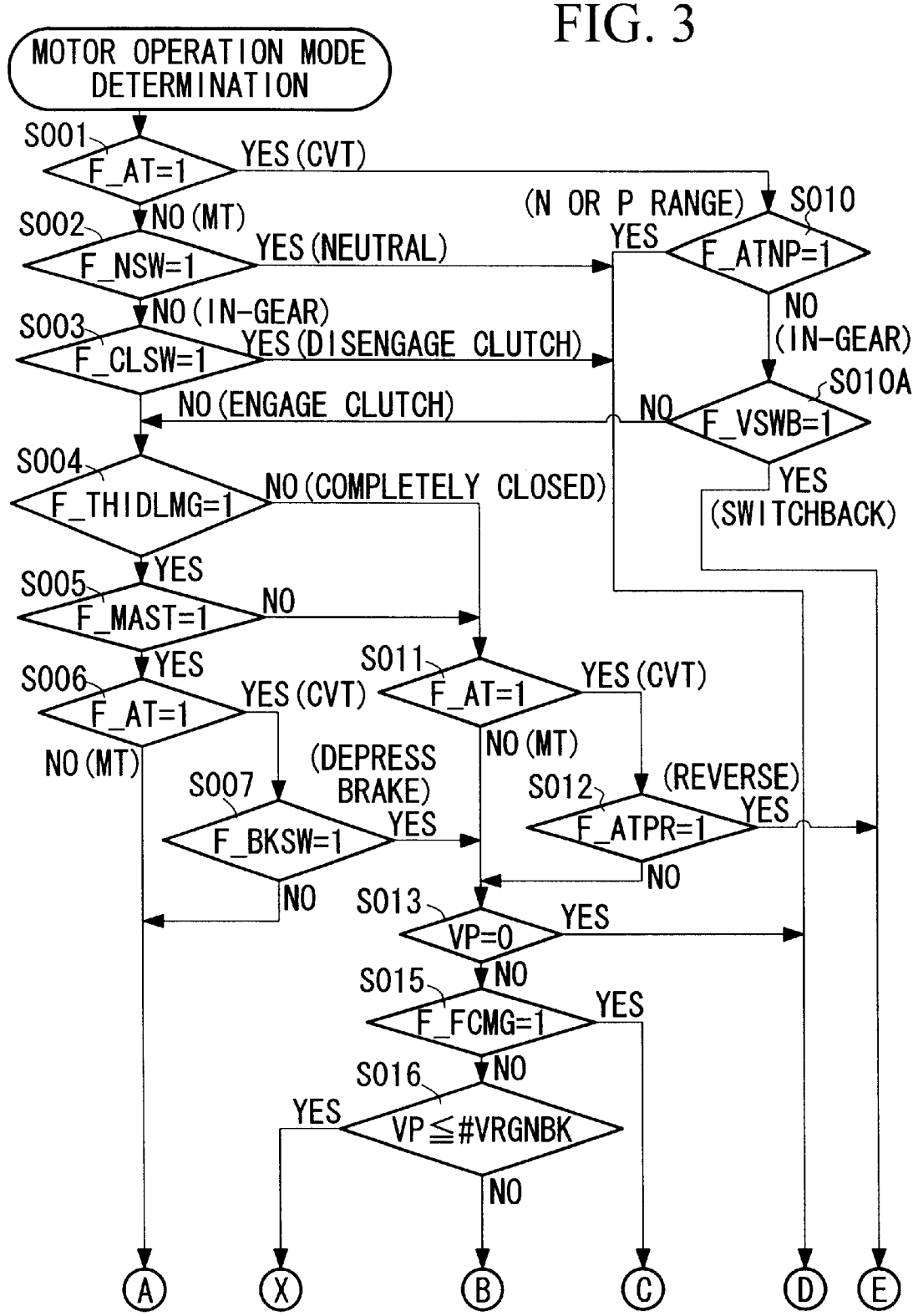
FIG. 3 is a flowchart showing the motor operation determination in the present invention.
Figure 5:
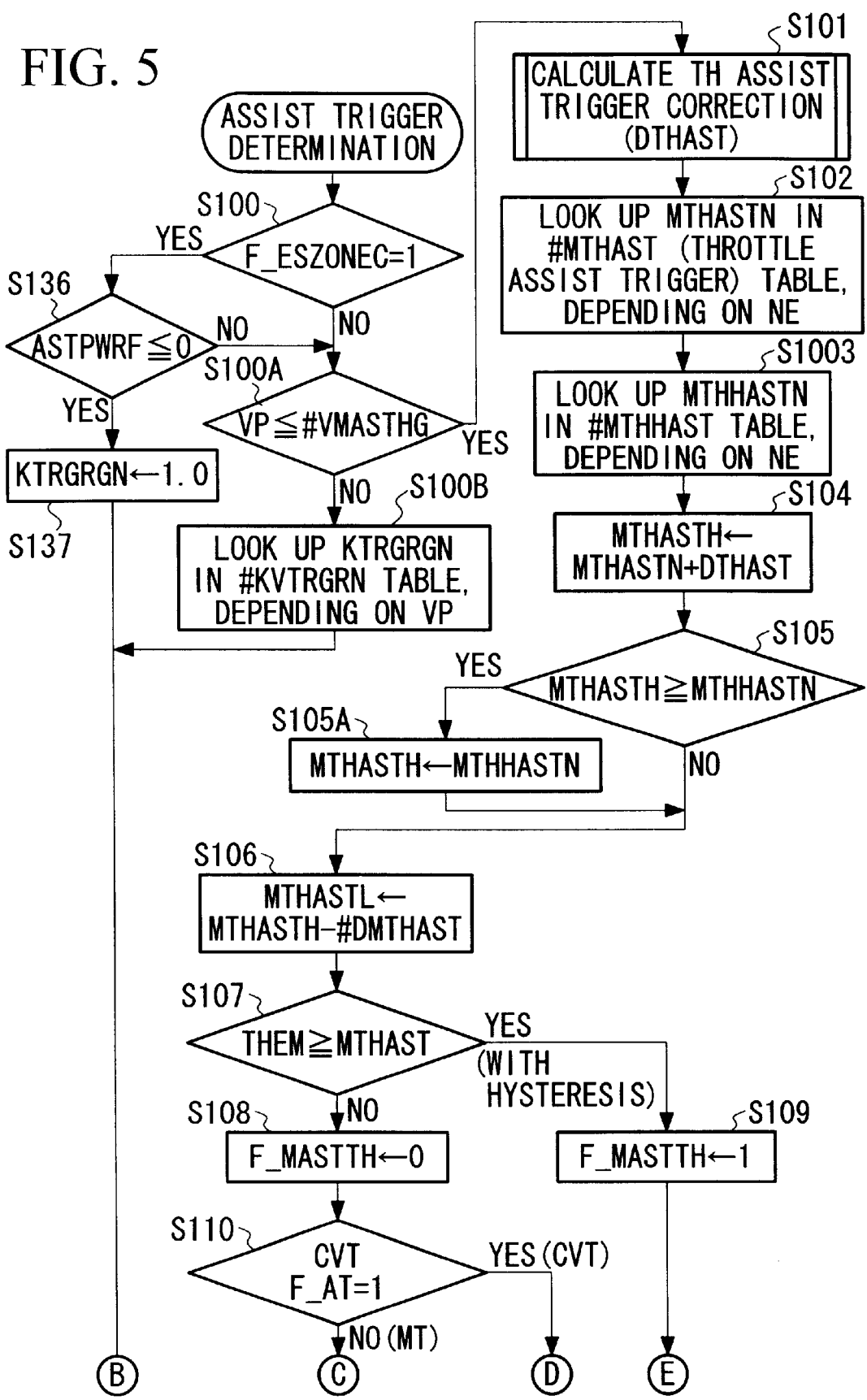
FIG. 5 is a flowchart showing the assist trigger determination in the present invention.
Figure 6:
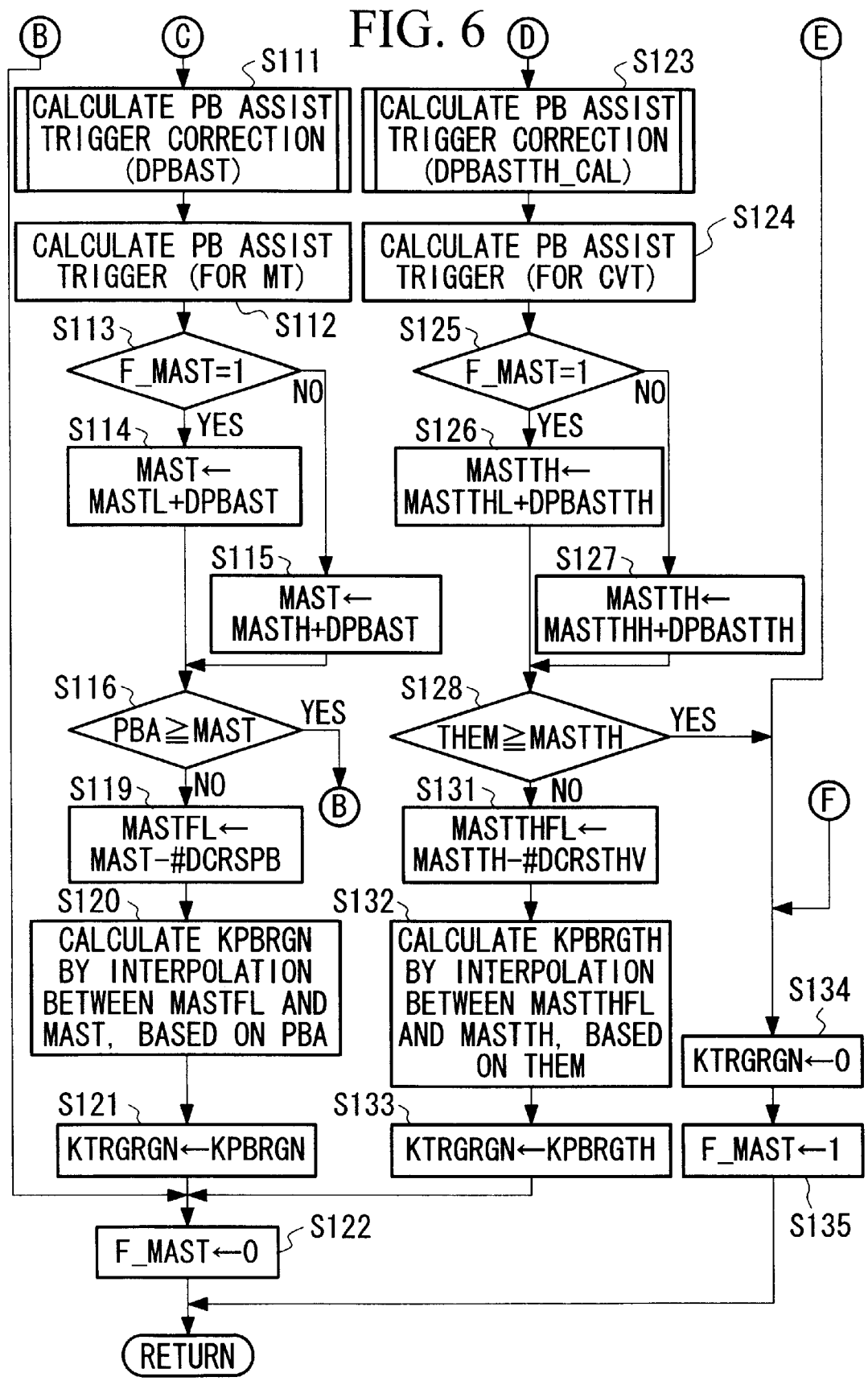
FIG. 6 is a flowchart showing the assist trigger determination in the present invention.

FIGS. 5 and 3 are flowcharts showing the assist trigger determination which specifically determines the acceleration/cruise mode based on zones.

In step S100, it is determined whether an energy storage zone C flag F_ESZONEC is 1. When this determination is YES, that is, when the battery remaining charge SOC is in zone C, it is determined in step S136 whether a final assist command value ASTPWRF is equal to or below 0. When in step S136 the determination is YES, that is, when the final assist command value ASTPWRF is equal to or below 0, a cruise charging subtraction coefficient KTRGRGN is set to 1.0 in step S137, a motor assist determination flag F_MAST is set to 0 in step S122, and the flow returns.

When in steps S100 and S136 the determination is NO, the flow proceeds to step S100A. In step S100A, the vehicle speed VP is compared with an assistance trigger look-up upper vehicle speed #VMASTHG. The #VMASTHG has hysteresis.

When in step S100A the vehicle speed VP is equal to or below the assistance trigger look-up upper vehicle speed #VMASTHG, the flow proceeds to step S101. The #VMASTHG is, for example, 170 km.

Figure 7:
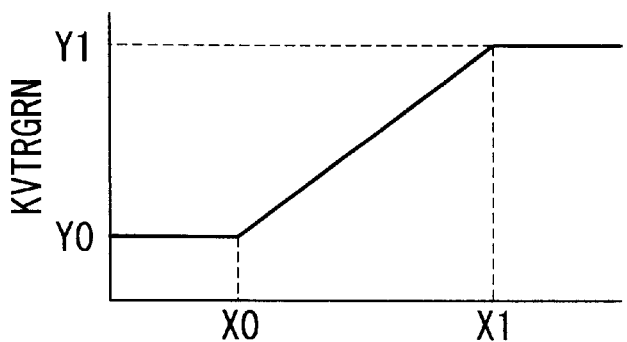
FIG. 7 is a graph for determining a cruise charging amount correction coefficient when at a high speed according to the present invention.

When in step S100A the vehicle speed VP is above the assistance trigger look-up upper vehicle speed #VMASTHG, the flow proceeds to step S100B. In step S100B, as shown in FIG. 7, a cruise charging amount correction coefficient KTRGRGN for high speed cruising is looked up in a #KVTRGRN table, based on the vehicle speed VP. The flow proceeds to step S122. The KTRGRGN is used as a coefficient in step S365 in FIG. 19. As the vehicle speed is increased, the coefficient is increased, and the cruise charging amount CRSRGN is gradually increased. Therefore, the motor is not suddenly switched from the driving operation to the charging operation, and is smoothly switched, preventing unstable behavior of the vehicle.

Figure 15:
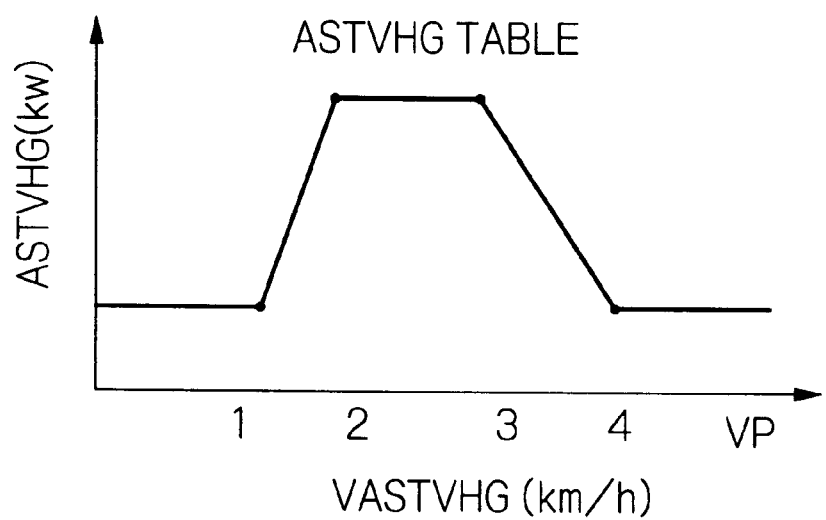
FIG. 15 is a graph showing the upper limit value of the amount of assistance in the present invention.

When in the determination in step S100A the vehicle speed VP is above the assist trigger look-up upper vehicle speed #VMASTHG, step S100A does not look up the assist trigger after step S100B, and does not enter the acceleration mode. Further, the motor assistance is gradually decreased as shown in FIG. 15 which is explained below. This prevents a shock due to variations in the driving power which are caused by suddenly stopping the motor assistance.

In step S101, a throttle assist trigger correction value DTHAST is calculated. The process increases the assist trigger threshold value, depending on the atmospheric pressure, when the consumed electric power consumption at 12 volts is high.

Figure 9:
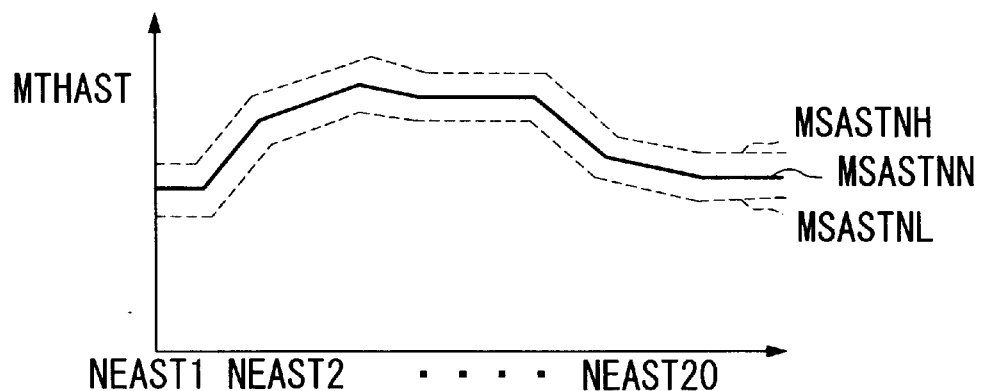
FIG. 9 is a graph showing threshold values in a TH assist mode and in a PB assist mode in the present invention.

In step S102, a threshold value MTHASTN which is the standard for the throttle assist trigger is looked up in a #MTHAST throttle (assist trigger) table. The #MTHAST throttle assist trigger table, as shown with the solid line in FIG. 9, defines the threshold value MTHASTN of the degree of throttle opening depending on the engine speed NE. The threshold value MTHASTN is the standard for the determination of whether the motor assist is performed, and is based on the engine speed NE.

Subsequently, in steps S103 and S106, the threshold value MTHASTN which is the standard for the throttle assist trigger obtained in step S102 is added to the correction value DTHAST calculated in step S101 to obtain an upper throttle assist trigger threshold MTHASTH. A difference #DMTHAST for setting the hysteresis is subtracted from the upper throttle assist trigger threshold value MTHASTH to obtain a lower throttle assist trigger threshold value MTHASTL. These upper and lower throttle assist trigger threshold values are shown with the dashed lines MSASTNH and MSASTNL in FIG. 9, overlapping the standard threshold value MTHASTN of the throttle assist trigger table.

Figure 10:
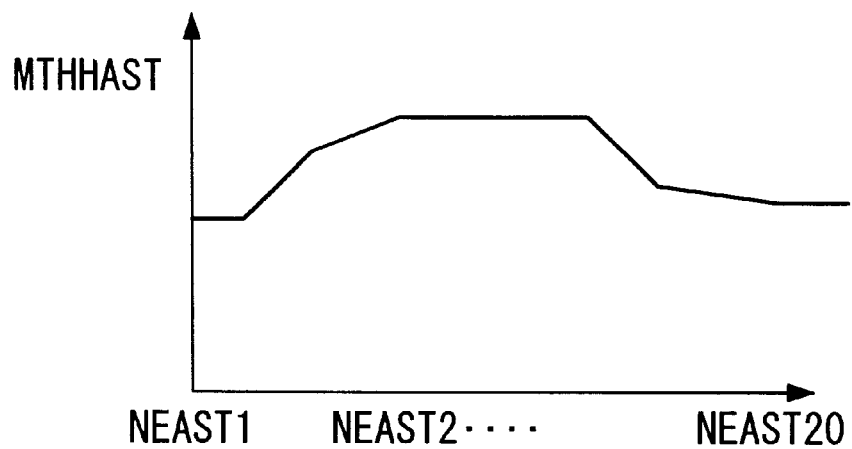
FIG. 10 is a graph showing a TH assist trigger upper limit in the present invention.

In step S104 after step 103, a throttle assist trigger upper limit value MTHHASTN is looked up in a throttle assist trigger upper limit table, shown in FIG. 10, depending on the engine speed NE. In step S105, it is determined whether the upper throttle assist trigger threshold value MTHASTH obtained in step S103 is equal to or above the MTHHASTN. When the MTHASTH is equal to or above the MTHHASTN, the flow proceeds to step S105A, the MTHASTH is then set to the MTHHASTN, and the flow proceeds to step S106. When in step S105 the MTHASTH is below the MTHHASTN, the flow proceeds to step S106.

Thus, steps S104, S105, and S105A sets the assist trigger threshold value below the throttle assist trigger upper limit value MTHHASTN, regardless of the additional amount for the assist trigger threshold value when correcting the throttle assist trigger in step S101 described below. The MTHASTH has an upper limit which depends on the engine speed NE, which avoids the situation in which the assistance is hard to start, and which improves the driveability.

In step S107, it is determined whether the present value THEM of the degree (extent, or state) TH of throttle opening is equal to or above the throttle assist trigger threshold value MTHAST calculated in steps S105 and S106. The throttle assist trigger threshold value MTHAST, which includes the hysteresis mentioned above, refers to the upper throttle assist trigger threshold value MTHASTH when the degree TH of the throttle opening is increased, and refers to the lower throttle assist trigger threshold value MTHASTL when the degree TH of the throttle opening is decreased.

When in step S107 the determination is YES, that is, when the present value THEM of the degree TH of throttle opening is equal to or above the throttle assist trigger threshold value MTHAST (which has the upper and lower hysteresis), the flow proceeds to step S109. When in step S107 the determination is NO, that is, when the present value THEM of the degree TH of throttle opening is not equal to or above the throttle assist trigger threshold value MTHAST (which has the upper and lower hysteresis), the flow proceeds to step S108.

In step S109, the throttle motor assist determination flag F_MASTTH is set to 1. In step S108, the throttle motor assist determination flag F_MASTTH is set to 0.

In the above process, it is determined whether the motor assist is required according to the degree TH of the throttle opening. When in step S107 the present value THEM of the degree TH of the throttle opening is equal to or above the throttle assist trigger threshold value MTHAST, the throttle motor assist determination flag F_MASTTH is set to 1. In the above-described acceleration mode, the flag is read and it is determined that the motor assist is required.

When in step S108 the throttle motor assist determination flag F_MASTTH is set to 0, this indicates that the vehicle is outside the zone in which the motor assist determination is made based on the degree TH of throttle opening. The embodiment performs the assist trigger determination based on the throttle opening state TH or on the air intake passage pressure PB of the engine. When the present value THEM of the degree TH of the throttle opening is equal to or above the throttle assist trigger threshold value MTHAST, the assist determination is made based on the opening state TH of the throttle, while, when the present value THEM does not exceed the threshold value MTHAST, the determination is made based on the air intake passage pressure PB.

In step S109, the throttle motor assist determination flag F_MASTTH is set to 1. Then, the flow proceeds to step S134, separating from the normal assist determination, and the cruise generation subtraction coefficient KTRGRGN is set to 0. In the next step S135, the motor assist determination flag F_MAST is set to 1, and the flow returns.

In step S110, it is determined whether a MT/CVT determination flag F_AT is 1. When this determination is NO, that is, when the vehicle is an MT vehicle, the flow proceeds to step S111. When in step S110 the determination is YES, that is, when the vehicle is a CVT vehicle, the flow proceeds to step S123. In step S111, an air intake passage assist trigger correction value DPBAST is calculated. This process increases the assist trigger threshold value, depending on the atmospheric pressure, when the 12-volt consumed electric power is high.

Figure 11:
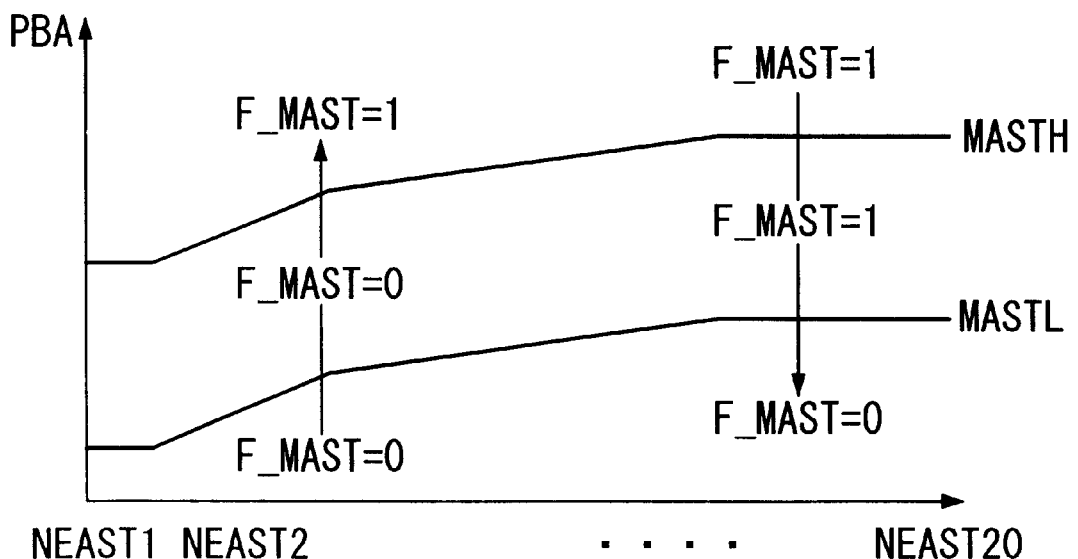
FIG. 11 is a graph showing threshold values for an MT vehicle in the PB assist mode in the present invention.

Subsequently, in step S112, threshold values MASTL and MASTH (for an MT vehicle) for the air intake passage pressure assist trigger are looked up in an air intake passage pressure assist trigger table. The air intake passage pressure assist trigger table, as shown with the two solid lines in FIG. 11, defines the upper air intake passage pressure assist trigger threshold value MASTH and the lower air intake passage pressure assist trigger threshold value MASTL for determining whether the motor assist is required depending on the engine rotational speed NE. In the process in step S112, when the air intake passage pressure PBA, as the PBA is increased or as the engine rotational speed NE is decreased, crosses the upper threshold value line MASTH from the lower area to the upper area in FIG. 11, the motor assist determination flag F_MAST is switched from 0 to 1. When the air intake passage pressure PBA, as the PBA is decreased or as the engine rotational speed NE is increased, crosses the lower threshold value line MASTL from the upper area to the lower area, the motor assist determination flag F_MAST is switched from 1 to 0. The process shown in FIG. 11 is changed depending on the stoichiometric or the lean-burn state.

In the next step S113, it is determined whether the motor assist determination flag F_MAST is 1. When this determination is 1, the flow proceeds to step S114. When the determination is not 1, the flow proceeds to step S115. In step S114, the air intake passage pressure lower threshold value MASTL calculated in step S112 and the correction value DPBAST calculated in step S111 are added to thereby obtain an air intake passage assist trigger threshold value MAST. In step S116, it is determined whether the present air intake passage pressure PBA is equal to or above the MAST obtained in step S114. When this determination is YES, the flow proceeds to step S134. When the determination is NO, the flow proceeds to step S119. In step S115, the air intake passage assist trigger upper threshold value MASTH looked up in step S112 and the correction value DPBAST calculated in step S111 are added to thereby obtain the air intake assist trigger threshold value MAST, and the flow proceeds to step S116.

Figure 8:
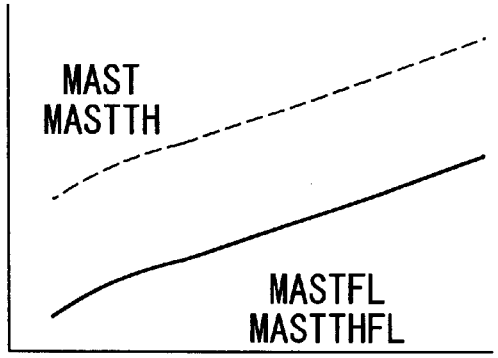
FIG. 8 is a graph for calculating the values in steps S119 and S131 according to the present invention.
Figure 12:
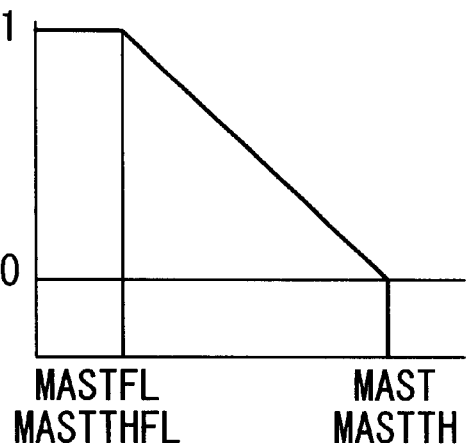
FIG. 12 is a graph for the calculation in steps S120 and S132 in the present invention.

In step S119, as shown in FIG. 8, a predetermined air intake passage pressure delta value #DCRSPB (e.g., 100 mmHg) is subtracted from the air intake passage pressure assist trigger threshold value MAST, to thereby obtain a final air intake passage pressure lower threshold value MASTFL. Then, in step S120 as shown in FIG. 12, the threshold value is interpolated between MASTFL and MAST, based on the present air intake passage pressure PBA, to thereby obtain a cruise charging subtraction coefficient KPBRGN. In step S121, this KPBRGN is set as the cruise charging subtraction coefficient KTRGRGN. In step S122, the motor assist determination flag F_MAST is set to 0, and the flow returns.

In step S123, the air intake passage pressure assist trigger correction value DPBASTTH has been calculated. The process increases the assist trigger threshold value, depending on the atmospheric pressure, when the electric power consumption at 12 volts is high.

Figure 13:
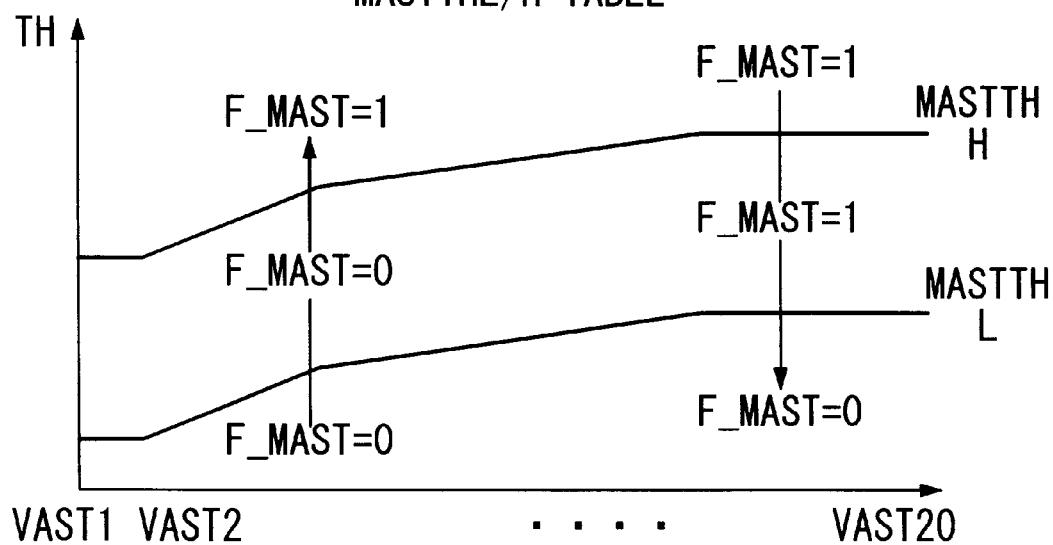
FIG. 13 is a graph showing threshold values for a CVT vehicle in the PB assist mode in the present invention.

In step S124, the PB assist trigger threshold values MASTTHL and MASTTHH (for a CVT vehicle) are looked up in the PB assist trigger table. The PB assist trigger table, as shown in FIG. 13 with two solid lines, defines the upper PB assist trigger threshold value MASTTHH and the lower PB assist trigger threshold value MASTTHL for determining whether to perform the assist by the motor, depending on the vehicle speed VP. In the look-up process in step S124, when the degree TH of throttle opening, as it is increased or as the vehicle speed VP is decreased, crosses the upper threshold value line MASTTHH from the lower area to the upper area in FIG. 13, the motor assist determination flag F_MAST is switched from 0 to 1. When TH, as it is decreased or as VP is increased, crosses the lower threshold value line MASTTHL from the upper area to the lower area, the motor assist determination flag F_MAST is switched from 1 to 0. The process shown in FIG. 13 is changed depending on the position of the gear, and depending on the stoichiometric or lean-burn state.

In step S125, it is determined whether the motor assist determination F_MAST is 1. When the flag is 1, the flow proceeds to step S126. When it is not 1, the flow proceeds to step S127. In step S126, the lower PB assist trigger threshold value MASTTHL looked up in step S124 is added to the correction value DPBASTTH calculated in step S123, to thereby obtain the PB assist trigger threshold value MASTTH. In step S128, it is determined whether the present value THEM of the degree TH of throttle opening is equal to or above the PB assist trigger threshold value MASTTH calculated in step S126. When the determination is YES, the flow proceeds to step S134. When the determination is NO, the flow proceeds to step S131. In step S127, the upper PB assist trigger threshold value MASTTHH, and the correction value DPBASTTH are added to the PB assist trigger threshold value MASTTH, and the flow proceeds to step S128.

In step S131, a predetermined delta value #DCRSTHV of the degree TH of throttle opening is subtracted from the PB assist trigger threshold value MASTTH, to thereby obtain a final PB assist trigger lower threshold value MASTTHFL. In the next step S132, the threshold value is interpolated between MASTTHFL and MASTTH, based on the present value THEM of the degree TH of throttle opening, to obtain a cruise charging subtraction coefficient table value KPBRGTH, and in step S133 this KPBRGTH is set as the cruise charging subtraction coefficient KTRGRGN. In step S122, the motor assist determination flag F_MAST is set to 0, and the flow returns.

Acceleration Mode

Figure 14:
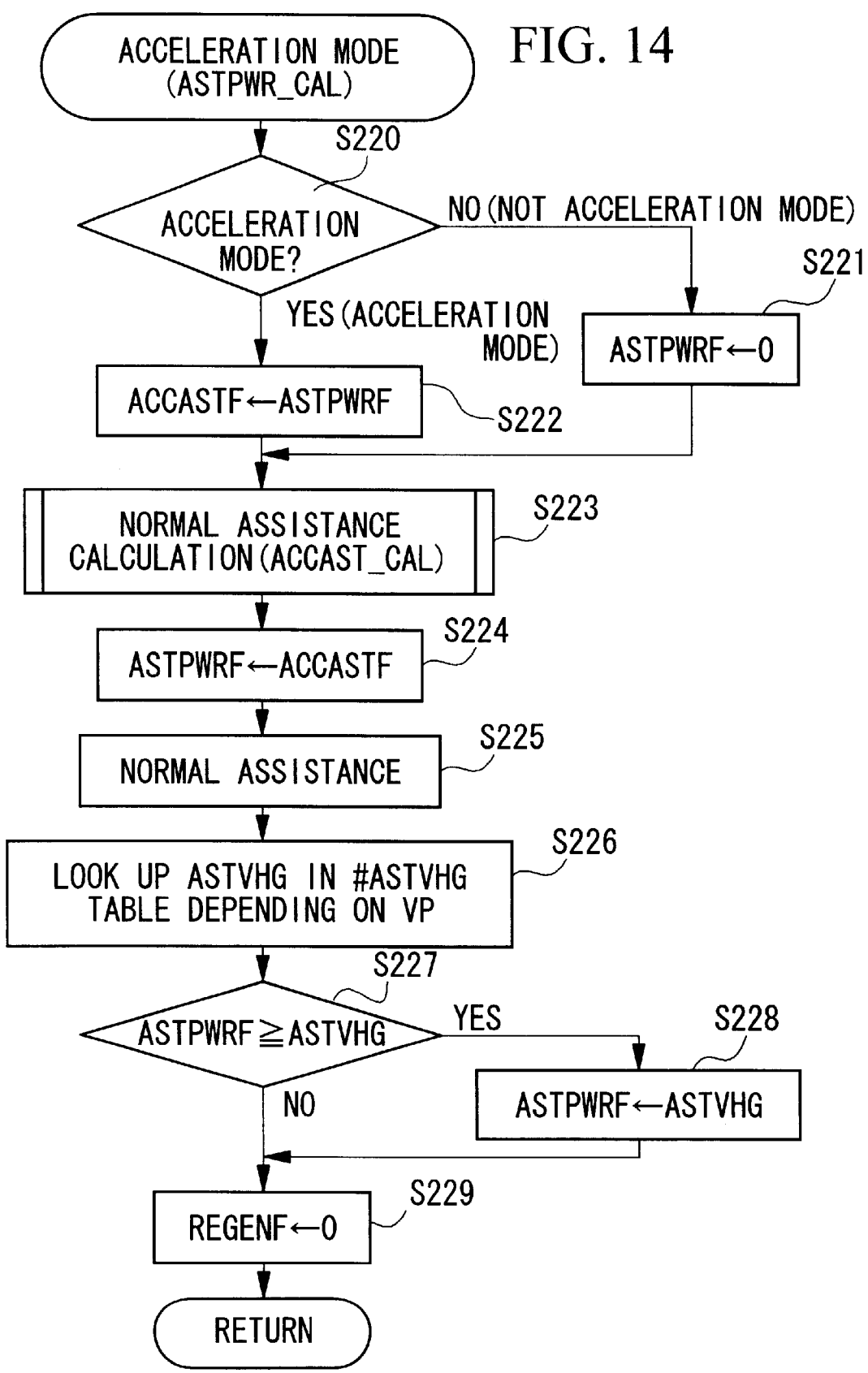
FIG. 14 is a flowchart showing the acceleration mode in the present invention.

FIG. 14 is a flowchart showing the acceleration mode. In the acceleration mode, the amount of assistance is calculated.

In step S220, it is determined whether the vehicle is in the acceleration mode. When the vehicle is not in the acceleration mode, the final assist command value ASTPWRF is set to 0 in step S221, and the flow proceeds to step S223. When in step S220 the vehicle is in the acceleration mode, a normal assist final calculated value ACCASTF is set to the ASTPWRF, and the flow proceeds to step S223.

In step S223, the normal assist calculation process is performed, and, in the next step S224, the final assist command value ASTPWRF is set to the final normal assist calculated value ACCASTF.

When in step S224 the final assist command value ASTPWRF is set to the predetermined amount of assistance, the normal assistance is started in step S225. Then, as shown in FIG. 15, in step S226, the assistance amount upper limit value ASTVHG is obtained from a table, depending on the vehicle speed VP for the engine control. In step S227, it is determined whether the ASTPWRF is equal to or above the ASTVHG. When this determination is YES, the final assist command value is set to the ASTVHG in step S228, the final generation amount is set to 0 in step S229, and the flow returns.

When in step S227 the determination is NO, the flow proceeds to step S229. Therefore, when the vehicle speed reaches a high speed above a predetermined value (VMASTHG) in the above-described step S100A, the assistance is limited, based on the vehicle speed, as shown in FIG. 15. Thus, the assistance is gradually decreased, and finally becomes zero. This process prevents unnecessary assistance, and is therefore advantageous in the terms of energy management. Further, the generation by the motor can be smoothly started, and therefore the drives does not experience a feeling of unease.

Cruise Mode

Next, the cruise mode will be explained with reference to FIGS. 16 to 26. The main flowchart of the cruise mode in FIG. 16 will be explained. In step S250A, it is determined whether the vehicle is in the cruise mode. When in step S250A the vehicle is not in the cruise mode, the final cruise charging amount CRSRGNF is set to 0 in step S250C, and the flow proceeds to step S250. When in step S250A the vehicle is in the cruise mode, the final cruise charging amount CRSRGNF is set to the final charging command value REGENF in step S250B, and the flow proceeds to step S250.

Figure 17:
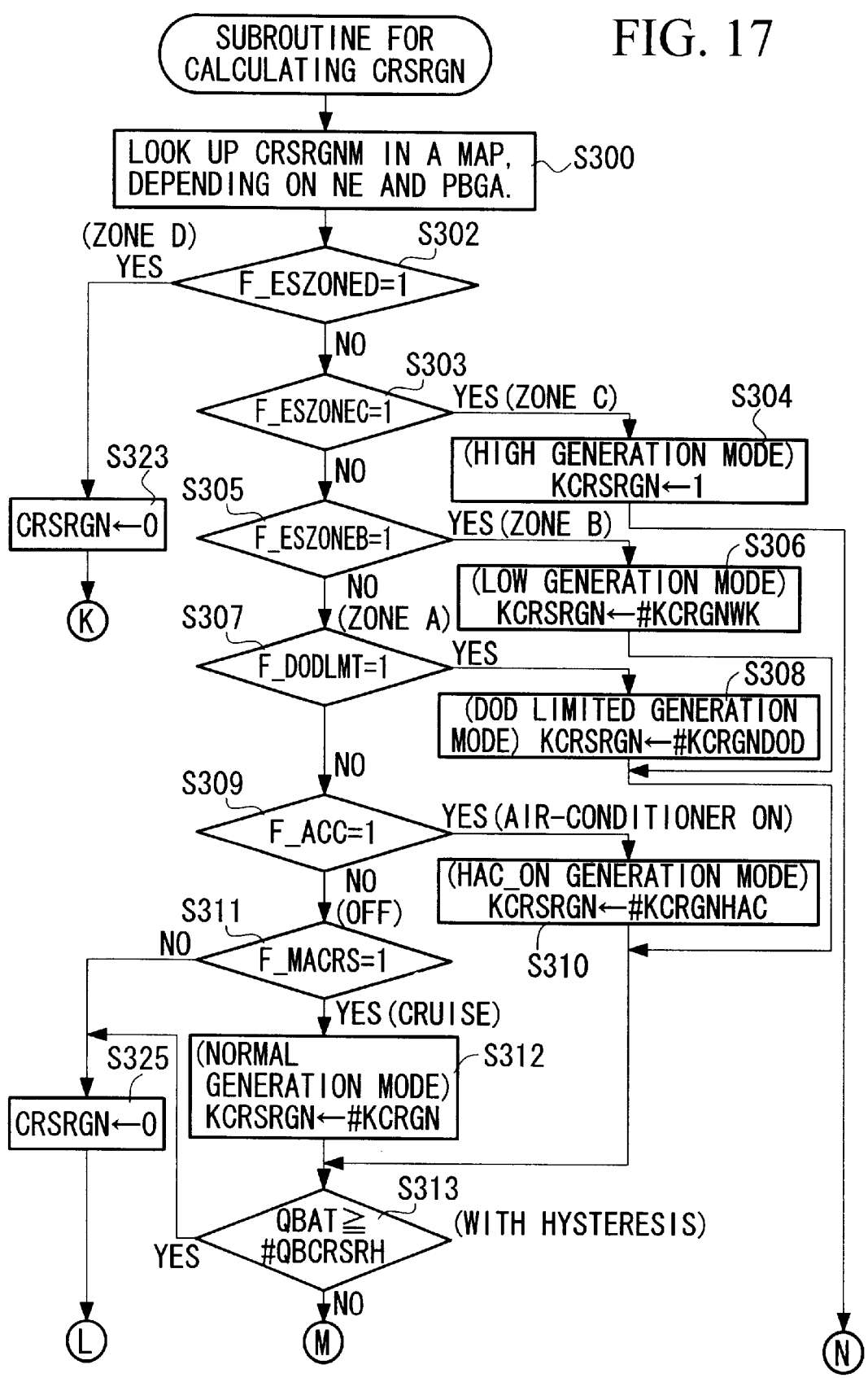
FIG. 17 is a flowchart showing the calculation of the amount of cruise charging in the present invention.
Figure 18:
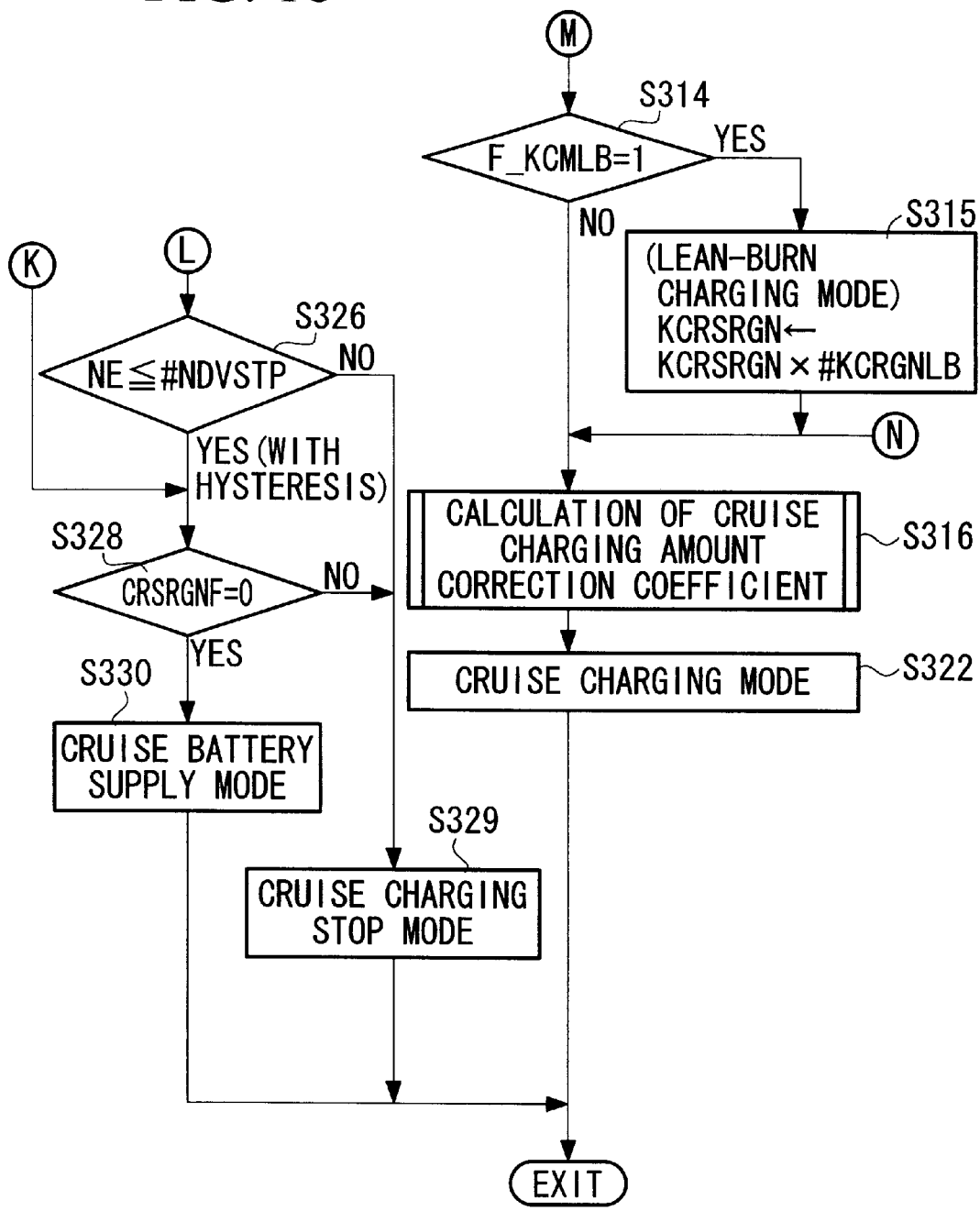
FIG. 18 is a flowchart showing the calculation of the cruise charging amount in the present invention.

Step S250 performs a process for calculating the cruise charging amount which will be described with reference to FIGS. 17 and 18. The flow proceeds to step S251, and it is then determined whether a gradual addition/subtraction timer TCRSRGN is zero. When this determination is NO, a final charging command value REGENF is set to a final cruise charging amount CRSRGNF in step S259, the final assistance command value ASTPWRF is set to zero in step S260, and the control terminates.

When in step S251 the determination is YES, the gradual addition/subtraction timer TCRSRGN is set to a predetermined value #TMCRSRGN in step S252, and the flow proceeds to step S253. In step S253, it is determined whether the cruise charging amount CRSRGN is equal to or above the final cruise charging amount CRSRGNF.

When in step S253 the determination is YES, the flow proceeds to step S257, and a gradual addition factor #DCRSRGNP is added to the CRSRGNF. Then, in step S258, it is again determined whether the CRSRGN is equal to or above the CRSRGNF. When in step S258 the CRSRGN is equal to or above the CRSRGNF, the flow proceeds to step S259.

When in step S258 the cruise charging amount CRSRGN is below the final cruise charging CRSRGNF, the flow proceeds to step S256, the CRSRGNF is set to the CRSRGN, and the flow proceeds to step S259.

When in step S253 the determination is NO, a gradual subtraction factor #DCRSRGNM is subtracted from the CRSRGNF in step S254, and it is determined in step S255 whether the CRSRGNF is equal to or above the CRSRGN. When in step S255 the CRSRGN is above the CRSRGNF, the flow proceeds to step S256. When in step S255 the CRSRGNF is equal to or above the CRSRGN, the flow proceeds to step S259.

The process following step S251 eliminates rapid variations in the amount of generation, and allows the vehicle to smoothly enter the cruise charging mode.

Figure 16:
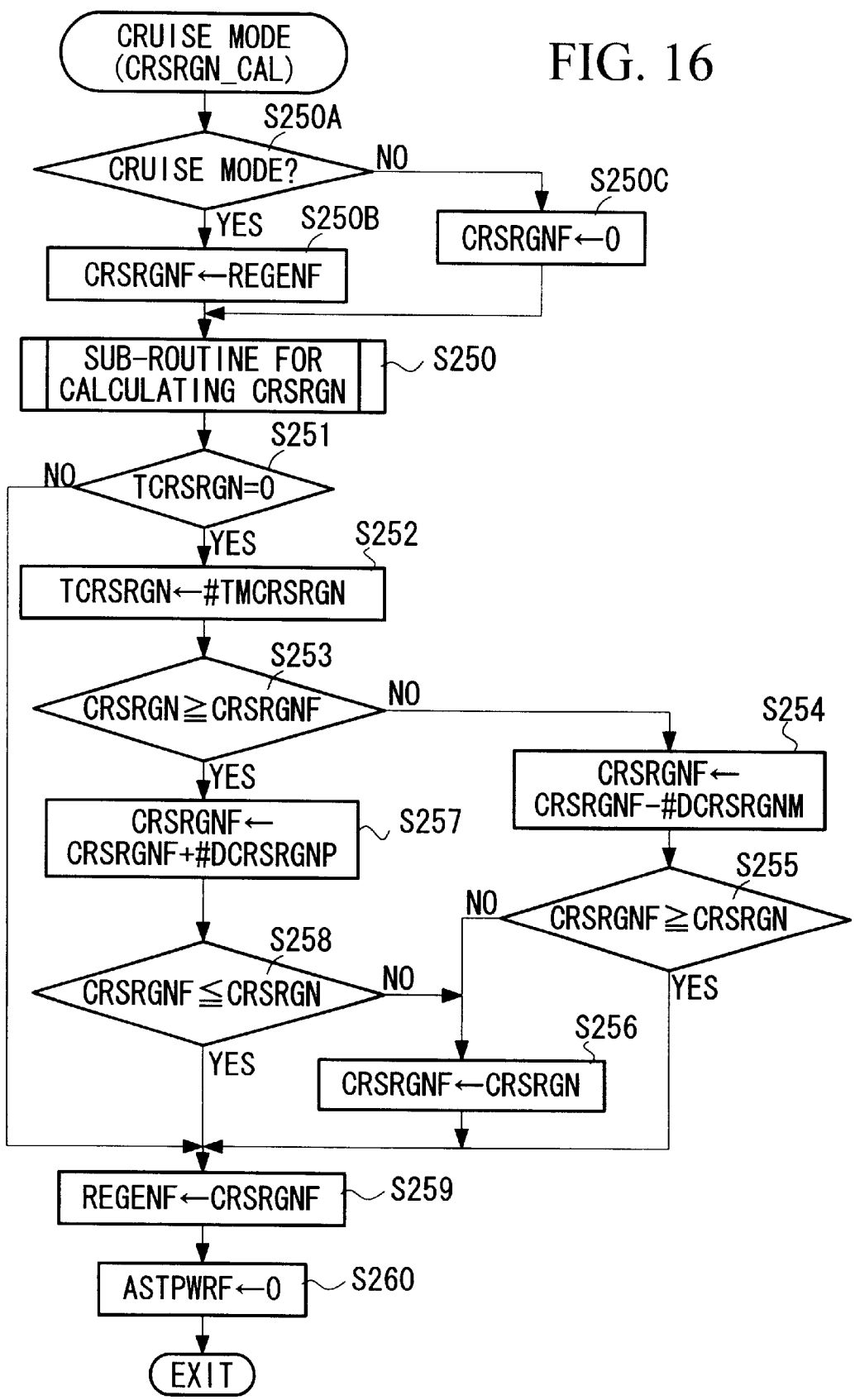
FIG. 16 is a main flowchart of a cruise mode in the present invention.

Next, the flowchart in step S250 of FIG. 16 for calculating the cruise charging amount will be explained with reference to FIGS. 17 and 18.

In step S300, a cruise charging amount CRSRNM is looked up in a map. The map defines the cruise charging amount, depending on the engine speed NE and the air intake passage pressure PBGA. The map is changed, depending on the MT or the CVT.

Then, the flow proceeds to step S302, and it is determined whether an energy storage zone D determination flag F_ESZONED is 1. When this determination is YES, that is, when the battery remaining charge SOC is in zone D, the flow proceeds to step S323, the cruise charging amount CRSRGN is set to 0, and the flow proceeds to step S328. It is determined in step S328 whether the final cruise charging command value CRSRGNF is 0. When in step S328 the command value CRSRGNF is not 0, the flow proceeds to step S329, and enters the cruise charging stop mode, and the control terminates. When in step S328 the command value CRSRGNF is zero, the flow proceeds to step S330, enters the cruise battery supply mode, and the control terminates.

When in step S302 the determination is NO, that is, when the remaining battery charge SOC is outside zone D, the flow proceeds to step S303, and it is then determined whether the energy storage zone C determination flag F_ESZONEC is 1. When this determination is YES, that is, when the remaining battery charge SOC is within zone C, the flow proceeds to step S304, and a correction coefficient KCRSRGN for the cruise charging is set to 1 (for a high charging mode). Then, the flow proceeds to step S316. When in step S303 the determination is NO, that is, when the remaining battery charge SOC is outside zone C, the flow proceeds to step S305.

In step S305, it is determined whether the energy storage zone B determination flag F_ESZONEB is 1. When this determination is YES, that is, when the remaining battery charge SOC is within zone B, the flow proceeds to step S306. In step S306, a correction coefficient KCRSRGN for the cruise charging is set to a cruise charging coefficient #KCRGNWK (for a low charging mode), and the flow proceeds to step S313.

When in step S305 the determination is NO, that is, when the remaining battery charge SOC is outside zone B, the flow proceeds to step S307, and it is then determined whether a DOD limitation determination flag F_DODLMT is 1. When in step S307 the determination is YES, the flow proceeds to step S308, the correction coefficient for the cruise charging amount KCRSRGN is set to the cruise charging amount coefficient #KCRGNDOD (for a DOD limited charging mode), and the flow proceeds to step S313. The DOD limited charging mode controls the amount of assistance and the amount of cruise charging to recover the remaining battery charge SOC when the initial remaining charge of the battery is decreased by a predetermined amount.

Therefore, the increased amount of generation quickly recovers the remaining battery charge SOC.

When in step S307 the determination is NO, the flow proceeds to step S309, and it is then determined whether an air-conditioner ON flag F_ACC is 1. When the determination is YES, that is, when the air conditioner is turned on, the flow proceeds to step S310, the correction coefficient for the cruise charging amount KCRSRGN is set to the cruise charging amount coefficient #KCRGNHAC (for a HAC_ON charging mode), and the flow proceeds to step S313.

When in step S309 the determination is NO, that is, when the air conditioner is turned off, the flow proceeds to step S311, and it is then determined whether a cruise mode determination flag F_MACRS is 1. When in step S311 the determination is NO, that is, when not in the cruise mode, the cruise charging amount CRSRGN is set to 0 in step S325, and the flow proceeds to step S326.

When in step S311 the determination is YES, that is, when in the cruise mode, the flow proceeds to step S312, the cruise charging amount CRSRGN is set to the cruise charging amount coefficient #KCRGN (for a normal charging mode), and the flow proceeds to step S313.

In step S326, it is determined whether the engine speed NE is equal to or below a cruise battery supply mode execution upper limit engine speed #NDVSTP. When this determination is YES, that is, when NE≦#NDVSTP, the flow proceeds to step S328.

When in step S326 the determination is NO, that is, when the engine speed NE>the cruise battery supply mode execution upper limit engine speed #NDVSTP, the flow proceeds to step S329. The #NDVSTP has hysteresis.

In step S313, it is determined whether the remaining battery charge QBAT (which is similar to the remaining battery charge SOC provided at the upper limit of zone A) is equal to or above a normal charging mode execution upper limit remaining charge #QBCRSRH. The #QBCRSRH has hysteresis.

When in step S313 the determination is YES, that is, when QBAT≧#QBCRSRH, the flow proceeds to step S325.

When the remaining battery charge QBAT<the normal charging mode execution upper limit remaining charge #QBCRSRH, it is determined in step S314 whether a lean-burn determination flag F_KCMLB is 1. When this determination is YES, that is, when in the lean-burn state, the correction coefficient KCRSRGN for the cruise charging amount is multiplied by the cruise charging amount coefficient #KCRGNLB (for the lean-burn charging mode) in step S315, the calculated value is set as the correction coefficient KCRSRGN for the cruise charging amount, the flow proceeds to step S316. When in step S314 the determination is NO, that is, when not in the lean-burn mode, the flow proceeds to step S316.

In step S316, a value for correcting the cruise charging amount (shown in FIG. 19), which is described below, is calculated, the mode enters the cruise charging mode in step S322, and the control terminates.

Figure 19:
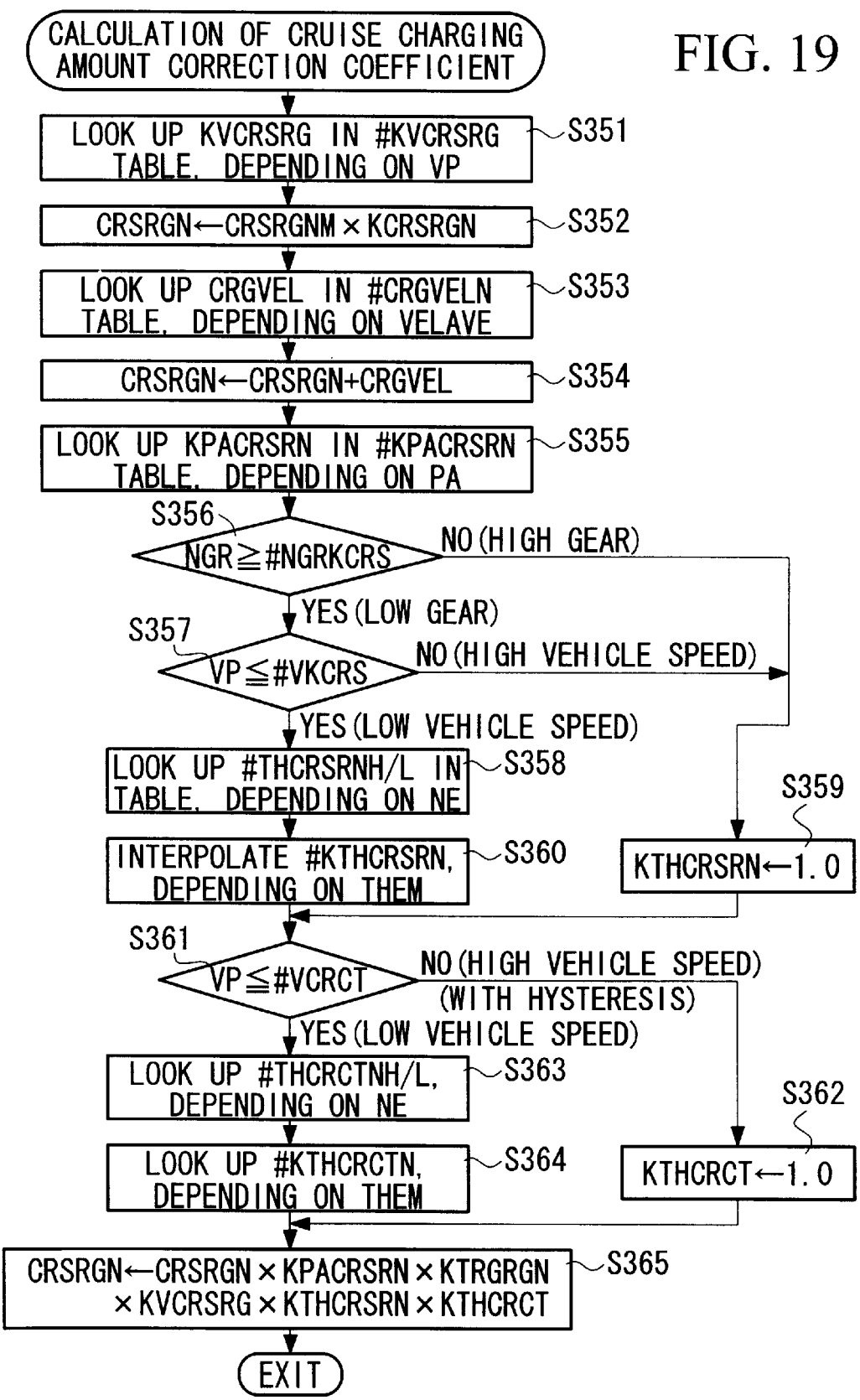
FIG. 19 is a flowchart showing the calculation of a cruise charging amount correction coefficient in the present invention.

The process for calculating the cruise charging amount correction coefficient in step S316 in the sub-routine for calculating the cruise charging amount in FIG. 18 will be explained with reference to the flowchart of FIG. 19.

Figure 20:
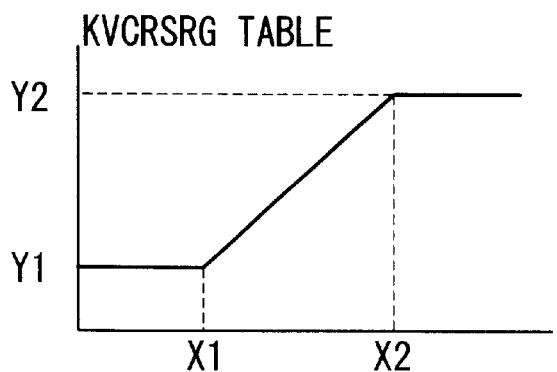
FIG. 20 is a graph for obtaining a cruise charging amount correction coefficient #KVCRSRG in the present invention.

In step S351, a cruise charging amount subtractive coefficient KVCRSRG is looked up in a #KVCRSRG table in FIG. 20, depending on the vehicle speed VP for the engine control. The coefficient is used when starting and accelerating the vehicle at a low speed, and becomes 1 when the vehicle reaches a predetermined speed. The coefficient is multiplied by the cruise charging amount in step S365.

In step S352, the map value CRSRGNM value (obtained in step S300) for the cruise charging amount is multiplied by the correction coefficient KCRSRGN (obtained in FIGS. 17 and 18) for correcting the cruise charging amount, and the calculated value is set as the cruise charging amount CRSRGN.

Figure 21:
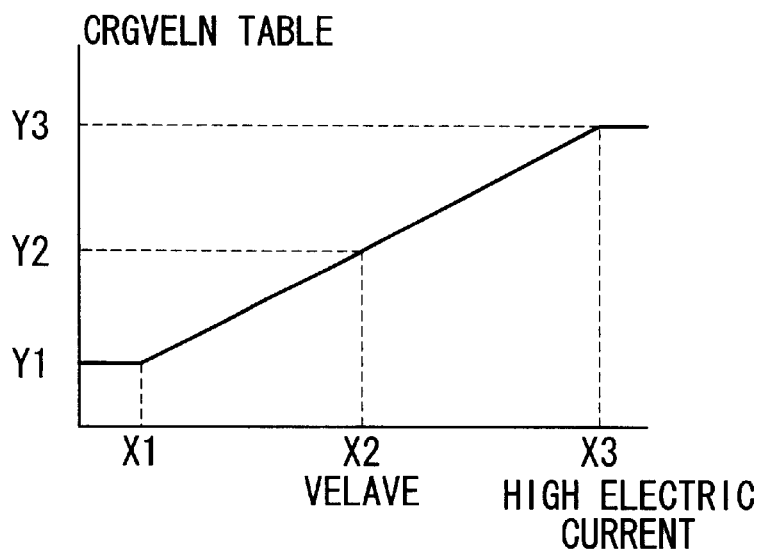
FIG. 21 is a graph for obtaining a cruise charging amount coefficient #KRGVELN in the present invention.

In step S353, a correction factor CRGVEL shown in FIG. 21 is looked up in a #CRGVELN table, depending on the average consumed current VELAVE, and the flow proceeds to step S354.

Figure 22:
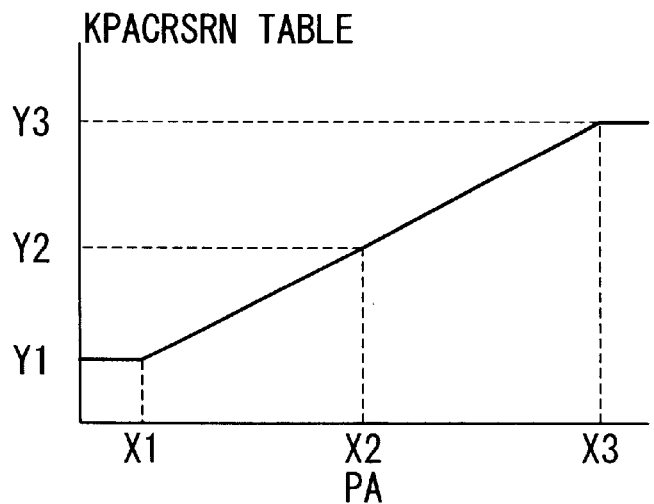
FIG. 22 is a graph for obtaining a cruise generation coefficient #KPACRSRN in the present invention.

In step S354, the cruise charging amount CRSRGN is added to the correction additional factor CRGVEL, and the flow proceeds to step S355. This increases the cruise charging amount to make up for the power consumed by the 12-volt system. In step S355, a cruise charging amount PA correction coefficient #KPACRSRN, shown in FIG. 22, is looked up in a KPACRSRN table, depending on the atmospheric pressure PA, and the flow proceeds to step S356.

Figure 23:
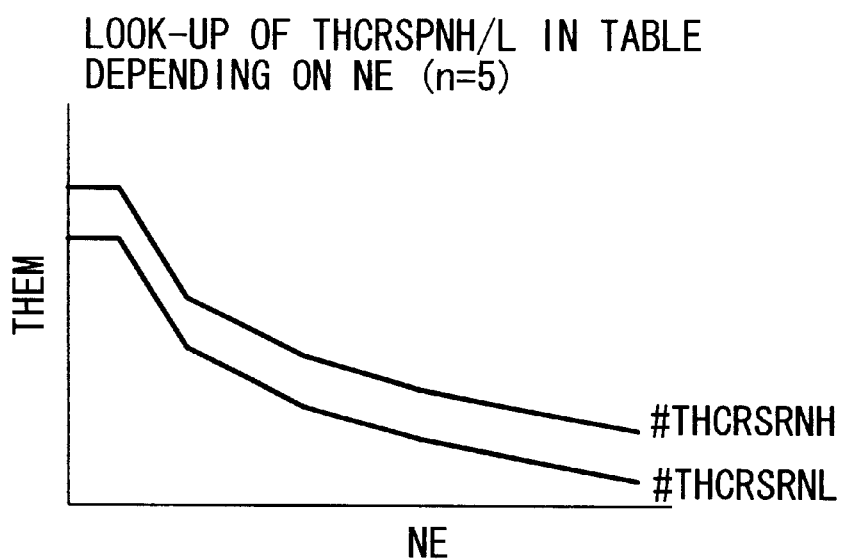
FIG. 23 is a graph showing a table for looking up the degree of throttle opening, depending on the engine speed in the present invention.
Figure 24:
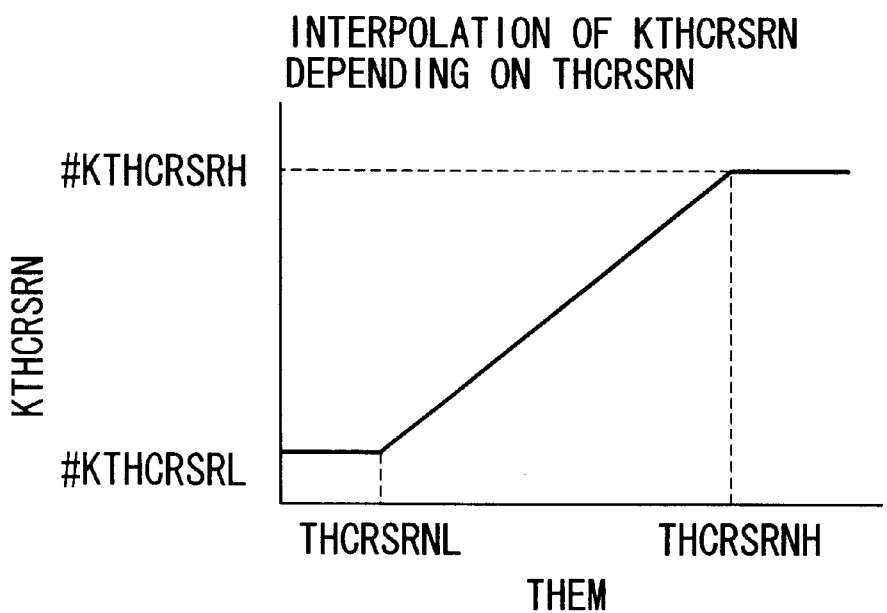
FIG. 24 is a graph for interpolating the cruise charging correction coefficient depending on the present degree of throttle opening in the present invention.

In step S356, it is determined whether the gear position NGR is equal to or above a #NGRKCRS cruise charging throttle correction execution lower limit gear position. When in step S356 this determination is NO, that is, when the gear is high (above the second gear), the flow proceeds to step S359, a cruise charging TH correction coefficient #KTHCRSRN is set to 1.0, and the flow proceeds to step S361. Because the coefficient is 1.0, sudden variations in the cruise charging amount can be prevented in step S365. When in step S356 the determination is YES, that is, when the gear is low, the flow proceeds to step S357, and it is determined whether the vehicle speed VP for the engine control is equal to or below a cruise charging throttle correction execution lower limit vehicle speed #VKCRS (e.g., 30 km/h at which the correction is conducted based on the throttle operation). The #VKCRS has hysteresis. When this determination is NO, that is, when at a high speed, the flow proceeds to step S359. When in step S357 the determination is YES, that is, when at a low vehicle speed, the flow proceeds to step S358. In step S358, the look-up process in a #THCRSRNH/L table, shown in FIG. 23, is performed, depending on the engine speed NE, and the flow proceeds to step S360. In step S360, as shown in FIG. 24, the #KTHCRSRN between the two points is interpolated, depending on the present value THEM of the degree TH of throttle opening to obtain a cruise charging throttle correction coefficient KTHCRSRN, and the flow proceeds to step S361.

In step S361, the vehicle speed VP for the engine control is compared with a cruise charging fully-opened throttle correction execution upper limit vehicle speed #VCRCT. The #VCRCT has hysteresis, and the higher #VCRCT is, e.g., 180 km/h.

When in step S361 the determination is NO, that is, when the throttle is fully opened while the vehicle is driving at a high speed, the cruise charging fully-opened throttle correction coefficient KTHCRCT is set to 1.0 in step S362, and the flow proceeds to step S365. Therefore, in this situation, the correction based on the throttle opening is not conducted, and the coefficient is fixed to 1.0.

Figure 25:
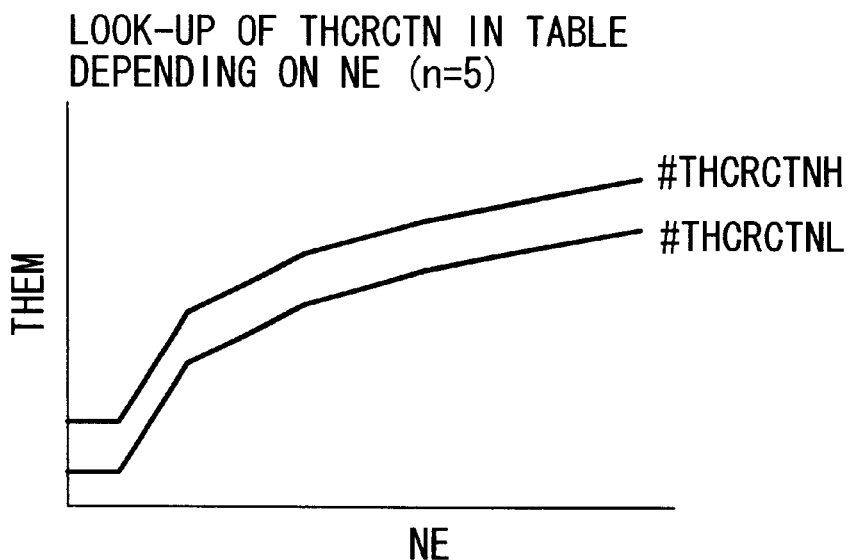
FIG. 25 is a graph for looking up a cruise charging fully-opened throttle correction coefficient depending on the engine speed in the present invention.

When in step S361 the determination is YES, that is, when at a low speed, the throttle opening degrees #THCRCTNH/L are looked up in a table in step S363, as shown in FIG. 25, depending on the engine speed NE, and the flow proceeds to step S364.

Figure 26:
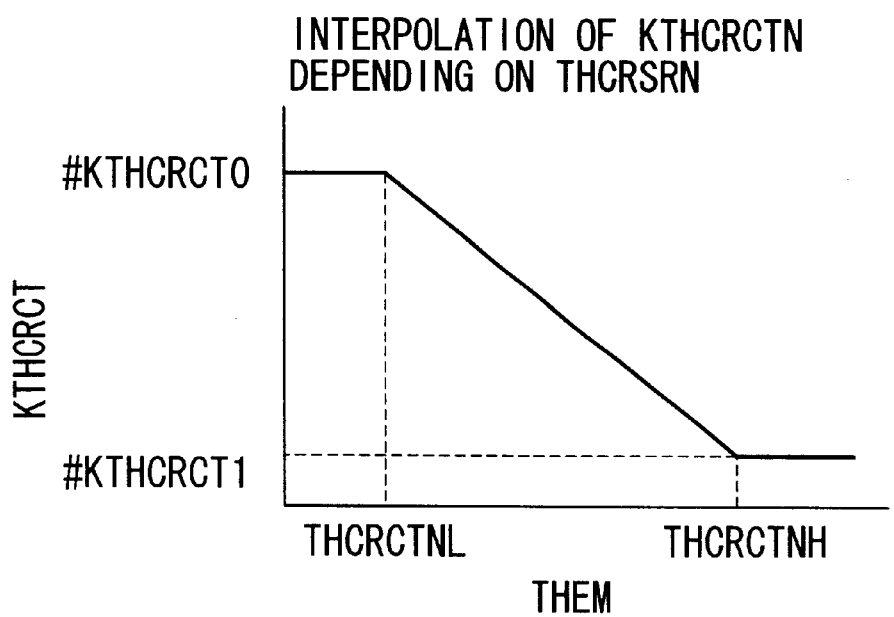
FIG. 26 is a graph for interpolating a cruise charging fully-opened throttle correction coefficient depending on the present degree of throttle opening in the present invention.

In step S364, as shown in FIG. 26, the cruise charging fully-opened throttle correction coefficient KTHCRCTN is obtained by the #KTHCRCTN interpolation depending on the present value THEM of the degree TH of throttle opening, and the flow proceeds to step S365. That is, the correction coefficient is determined based on the throttle opening. As the throttle opening is increased, the cruse charging amount is decreased.

In step S365, the cruise charging amount CRSRGN is multiplied by the cruise charging amount PA correction coefficient KPACRSRN obtained in step S355, the cruise charging amount subtraction coefficient KTRGRGN (set in step S121 in the assistance trigger determination), the cruise charging amount subtraction coefficient KVCRSRG obtained in step S351, the cruise charging TH correction coefficient KTHCRSRN calculated in step S360, and the cruise charging fully-opened throttle correction coefficient KTHCRCT obtained in step S364, to thereby obtain the final cruise charging amount CRSRGN.

Figure 27:
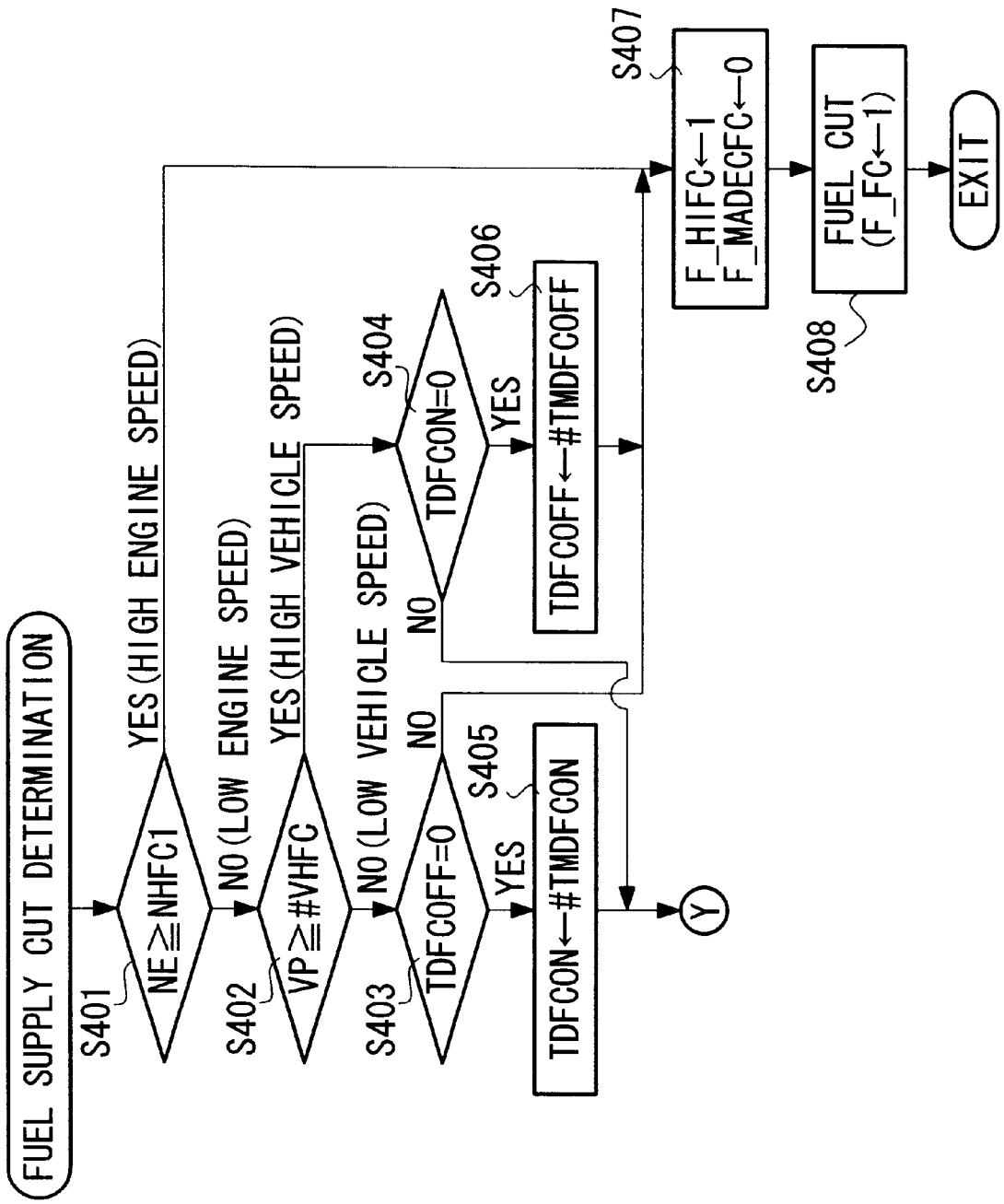
FIG. 27 is a flowchart showing the determination for stopping the fuel supply in the present invention.

The fuel supply cut determination will be explained with reference to FIGS. 27 and 28. The determination determines the deceleration fuel supply cut execution flag F_MADECFC in step S019 in FIG. 4. In step S401, it is determined whether the engine speed NE is equal to or above a higher speed fuel cut engine speed NHFC1. When in step S401 the determination is YES, that is, when the engine speed is high, the flow proceeds to step S407, a high engine speed fuel supply cut flag F_HIFC is set to 1, the deceleration fuel cut execution flag F_MADECFC is set to 0, and the flow proceeds to step S408.

In step S408, the fuel cut execution flag F_FC (the flag indicating that the fuel supply is being stopped) is set to 1, and the control terminates. The determination in step S401 stops the supply of fuel (F_HIFC=1) to protect the engine when the engine speed is high, for example, when a rev-limiter is actuated.

Figure 4:
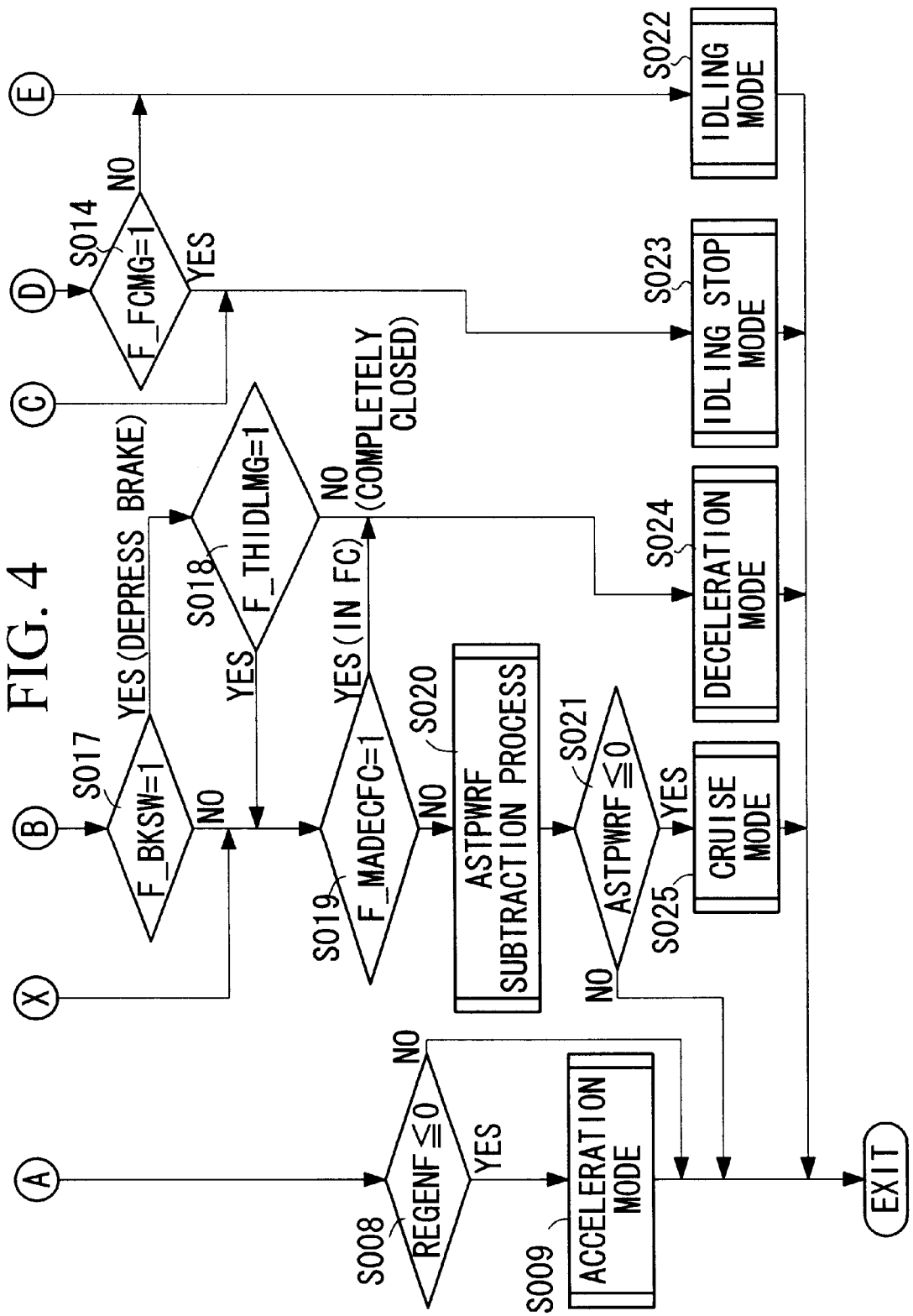
FIG. 4 is a flowchart showing the motor operation determination in the present invention.

According to the relationship with the F_MADECFC in step S019 in the motor operation mode determination in FIG. 4, the F_MADECFC is set to 0 in step S407. When the supply of fuel is stopped (F_FC is set to 1) by the high engine speed fuel supply cut operation, the vehicle decelerates. In this situation, if the motor operation may enter the deceleration mode (step S024), the vehicle decelerates excessively due to the fuel supply cut operation and to the motor deceleration mode, and the driver may experience a feeling of unease because of the jolt given to the vehicle. To avoid this, the present invention prevents the motor from entering the deceleration mode.

The higher speed fuel cut engine speed NHFC1 corrects the threshold value, based on the vehicle speed, the water temperature, the operation of the air-conditioner, and the throttle opening.

When in step S401 the determination is NO, that is, when the engine speed is low, the flow proceeds to step S402, and it is determined whether the vehicle speed VP for the engine control is equal to or above a vehicle speed #VHFC for a high vehicle speed limiter. The #VHFC is, e.g., 183 km/h. When in step S402 the determination is YES, that is, when the vehicle speed is high, it is determined in step S404 whether a high vehicle speed fuel supply cut delay timer TDFCON is 0. When it is 0, the flow proceeds to step S406.

In step S406, the high vehicle speed fuel supply cut restarting delay timer TDFCOFF is set to a predetermined value #TMDFCOFF (e.g., 0.2 sec.), and the flow proceeds to step S407. Step S407 for setting F_MADECFC to 0 prevents the simultaneous actuation of the fuel supply cut operation and the deceleration mode of the motor (regenerative braking) when the vehicle speed is high, in order to prevent a strong jolt from being impacted to the vehicle as described above.

Figure 28:
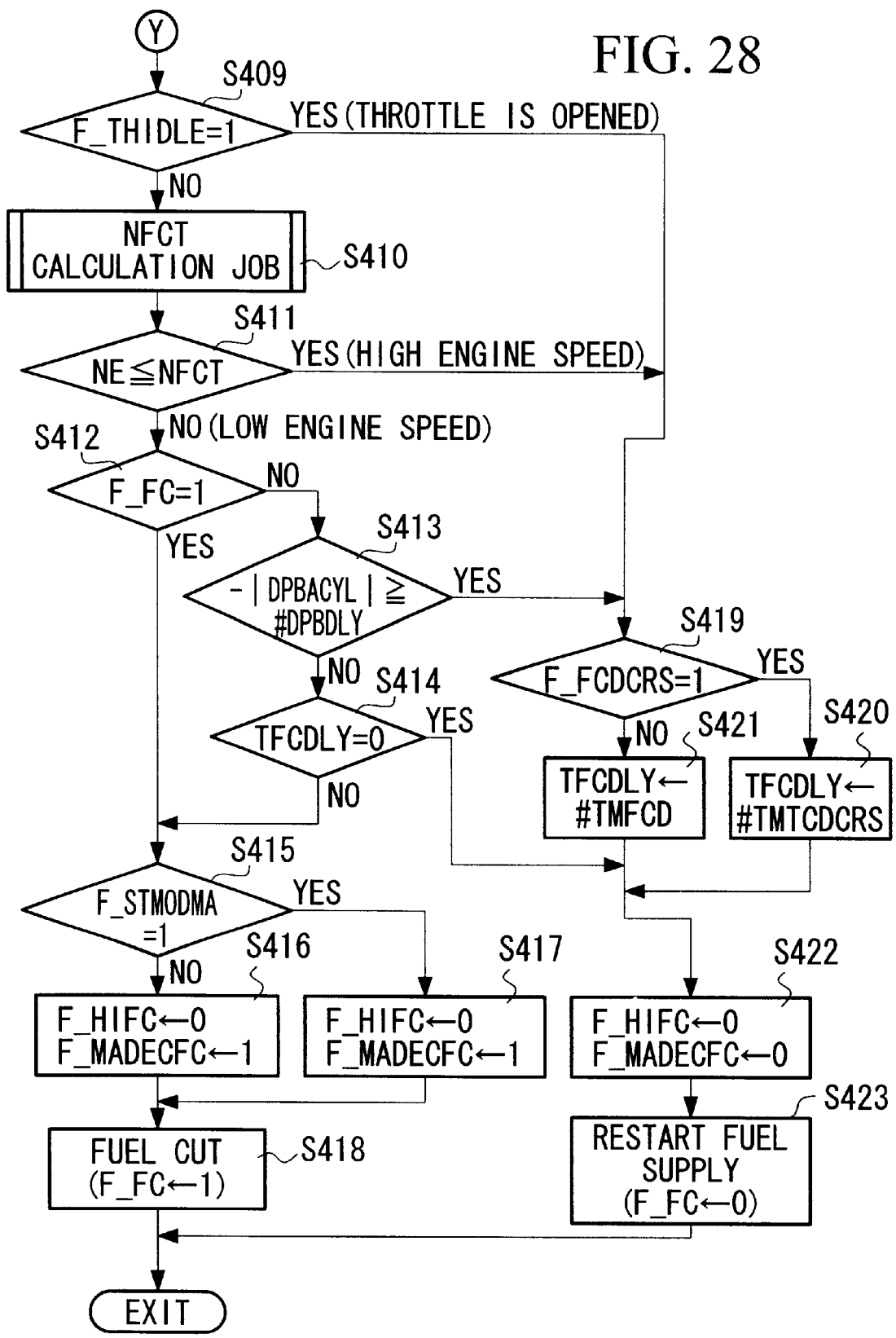
FIG. 28 is a flowchart showing the determination for stopping the fuel supply in the present invention.

When in step S404 the value is not 0, the flow proceeds to step S409 in FIG. 28.

The vehicle speed VP for the engine control is increased, and, while the VP is below the vehicle speed #VHFC for the high vehicle speed limiter, the high vehicle speed fuel supply cut delay timer TDFCON is set. When the VP exceeds the #VHFC, the fuel supply cut operation is not started until the TDFCON reaches 0. When the TDFCON becomes 0, the high vehicle speed fuel supply cut restarting delay timer TDFCOFF is set so as to start the fuel supply cut operation.

When in step S402 the determination is NO, that is, when the vehicle speed is low, the flow proceeds to step S403, and it is determined whether the high vehicle speed fuel supply cut restarting delay timer TDFCOFF is 0. When the timer is 0, the flow proceeds to step S405. In step S405, the vehicle speed fuel supply cut delay timer TDFCON is set to a predetermined value #TMDFCON (e.g., 0.5 sec.), and the flow proceeds to step S409. When in step S403 the timer is not 0, the flow proceeds to step S407.

As described in above step S407 for setting F_MADECFC to 0, the simultaneous actuations of the fuel supply cut operation and the deceleration mode of the motor (regenerative braking) can be prevented when the vehicle speed is high, in order to prevent a strong jolt from being impacted to the vehicle as described above.

In step S409, it is determined whether an idling determination flag F_THIDLE is 1. When the determination is YES, that is, when the throttle is opened, the flow proceeds to step S419. In step S419, it is determined whether a fuel supply cut delay change determination flag F_FCDCRS is 1.

When in step S419 the determination is YES, the fuel supply cut delay timer TFCDLY is set to a predetermined value #TMTCDCRS in step S420, and the flow proceeds to step S422.

In step S422, the high engine speed fuel supply cut flag F_HIFC is set to 0, the deceleration fuel supply cut execution flag F_MADECFC is set to 0, and the flow proceeds to step S423. In step S423, the fuel supply cut execution flag F_FC is set to 0, and the control terminates. When in step S419 the determination is NO, the fuel supply cut delay timer TFCDLY is set to a predetermined value #TMFCD in step S421, and the flow proceeds to step S422.

When in step S409 the idling determination flag F_THIDLE is 1, that is, when the throttle is closed, the flow proceeds to step S410, and a throttle fuel supply cut engine speed NFCT is calculated. The calculation appropriately sets the engine speed at which the fuel supply is to be stopped, depending on the driving condition, in order to respond to the demands from the fuel supply and from the driver.

In step S411, it is determined whether the engine speed NE is equal to or below the throttle fuel supply cut engine speed NFCT. When this determination is YES, that is, when the engine speed is high, the flow proceeds to step S419. When in step S411 the determination is NO, that is, when the engine speed is low, the flow proceeds to step S412.

In step S412, it is determined whether the fuel supply cut execution flag F_FC is 1. When the flag value is 0, the flow proceeds to step S413. In step S413, it is determined whether the absolute value of a DPBACYL indicating the difference between the present PBA and the PBA in the previous cycle is equal to or above a predetermined value #DPBDLY. This determines whether the air intake passage pressure PB is stable. When the determination is YES (the pressure is stable), the flow proceeds to step S419. When in step S413 the determination is NO (the pressure is not stable), the flow proceeds to step S414, and it is determined whether the fuel supply cut delay timer TFCDLY is 0. When this determination is YES, the flow proceeds to step S422. When in step S414 the determination is NO, the flow proceeds to step S415, and it is determined whether a motor starting mode flag F_STMODMA is 1.

When in step S415 the flag value is 1, that is, when the mode is the motor starting mode, the high engine speed fuel supply cut flag F_HIFC is set to 0, and the deceleration fuel supply cut execution flag F_MADECFC is set to 1 in step S417, and the flow proceeds to step S418. In step S418, the fuel supply cut execution flag F_FC is set to 1, and the control terminates.

When in step S415 the flag value is 0, that is, when the mode is not the motor starting mode, the high engine speed fuel supply cut flag F_HIFC is set to 0, and the deceleration fuel supply cut execution flag F_MADECFC is set to 1 in step S417, and the flow proceeds to step S418.

Figure 2:
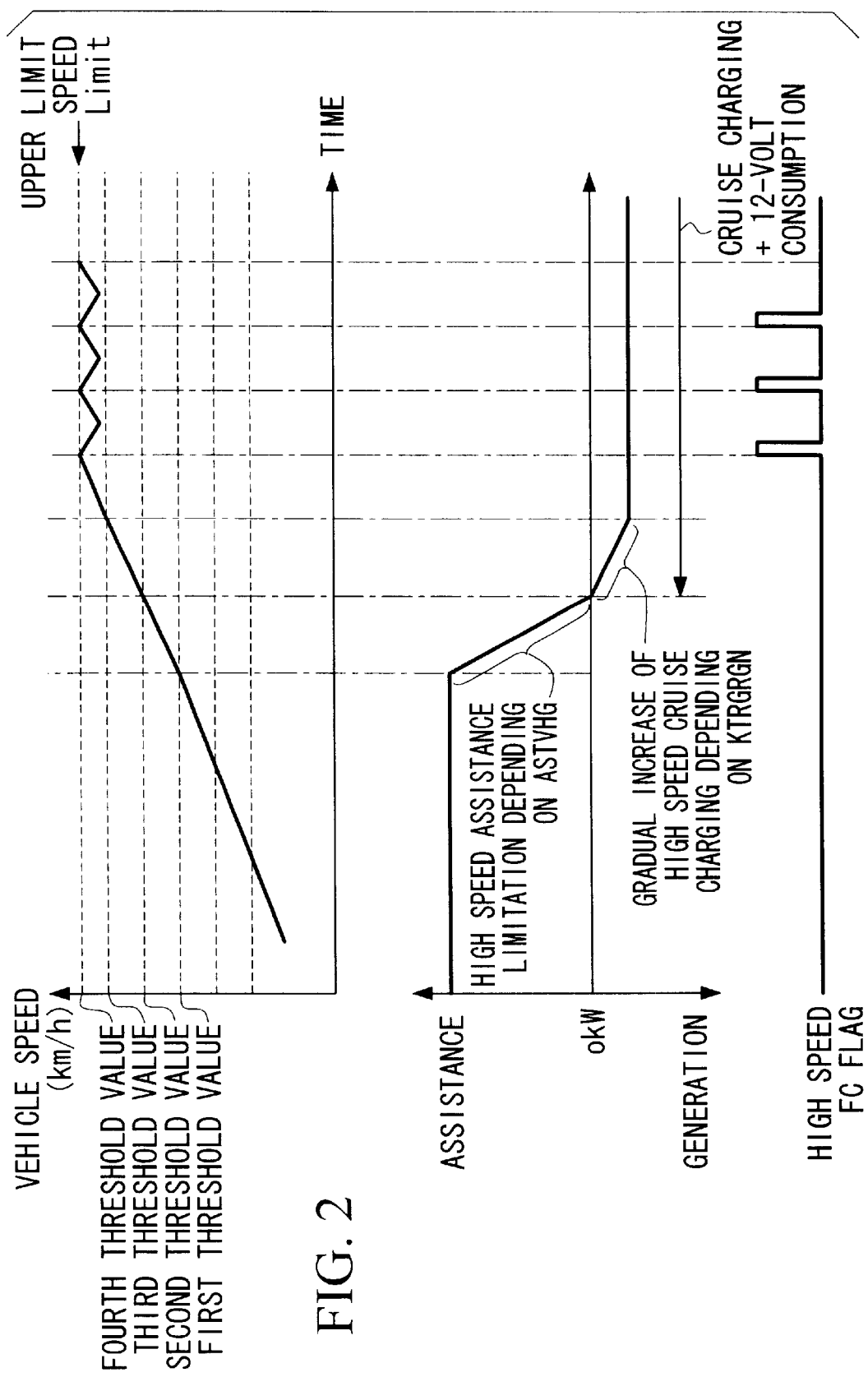
FIG. 2 is a graph showing the assistance, generation, and fuel supply cut operation when the vehicle of the present invention is driving at a high speed.

In this embodiment, as shown in FIG. 2, when the vehicle speed exceeds the assistance trigger look-up upper limit vehicle speed #VMASTHG, which is the first threshold value, e.g., 170 km/h, the assistance is limited by the assistance amount upper limit value ASTVHG, and the amount of assistance is decreased as shown in FIG. 15. Then, when the vehicle speed reaches the high vehicle speed point at which the amount of assistance is 0 as shown in FIG. 15, which is the second threshold value, e.g., 175 km/h, the cruise charging amount is gradually increased by the cruise charging amount correction coefficient KTRGRGN depending on the vehicle speed while the vehicle is driving at a high speed, and becomes a fixed generation amount (the cruise charging amount and the amount of energy consumed by the 12-volt system). Then, the vehicle speed exceeds the cruise charging fully-opened throttle correction execution upper limit vehicle speed #VCRCT, which is the third threshold value, e.g., 180 km/h. When 0.5 seconds have elapsed after the vehicle speed reaches the high vehicle speed limiter determination vehicle speed #VHFC, e.g., 183 km/h, the fuel supply is stopped by the high vehicle speed fuel supply cut delay timer TDFCON. When 0.2 seconds have elapsed after the vehicle speed becomes below the high vehicle speed limiter determination vehicle speed #VHFC, the fuel supply is restarted.

The driver's intentions can be sufficiently reflected by the control because, when calculating the cruise charging amount, the value looked up based on the engine speed NE and on the air intake passage pressure PB is multiplied by the correction value depending on the throttle opening.

Further, the control is suitable to the engine output characteristic because the variation (correction) is based on the engine speed NE.

When the vehicle is driving at a high speed and reaches the upper speed limit, the correction based on the throttle operation is prohibited, and the gradual decrease of the assistance, the gradual increase of the cruise charging, and the control of the fuel supply cut are effectively performed based on the vehicle speed, thereby optimizing the limitation in the vehicle speed, the maintenance of the vehicle speed, and the energy management in the high speed cruising range.

This invention may be embodied in other forms or carried out in other ways without departing from the spirit thereof. The present embodiments are therefore to be considered in all respects illustrative and not limiting, the scope of the invention being indicated by the appended claims, and all modifications falling within the meaning and range of equivalency are intended to be embraced therein.

What is claimed is:

1. A control apparatus for a hybrid vehicle with a combustion engine for outputting a driving force, an electric motor for generating a force for assisting the output from the engine, depending on the driving conditions, a power storage unit for storing electric energy generated by the motor acting as a generator using the output from the engine and electric energy regenerated by the motor when the vehicle decelerates, the control apparatus including:

a speed limiter for decreasing the driving force produced by the motor when the vehicle speed exceeds a first threshold value while the engine and the motor produce the driving force;

a generation starter for starting generation by the motor when the vehicle speed exceeds a second threshold value which is higher than the first threshold value; and a generation amount setting device for setting the amount of generation to be provided to the storage unit, depending on the driving conditions of the vehicle, when the generation starter starts the generation, wherein the motor generates the electric energy, depending on the amount of generation set by the generation amount setting device.

2. A control apparatus for a hybrid vehicle according to claim 1, wherein the speed limiter decreases the driving force produced by the motor after the vehicle speed exceeds the first threshold value until the vehicle speed reaches the second threshold value, and makes the motor stop the production of the driving force when at the second threshold value.

3. A control apparatus for a hybrid vehicle according to claim 1, further including a fuel supply stopper for repeating stopping of the supply of fuel at a predetermined interval when the vehicle speed reaches a fourth threshold value which is higher than the second threshold value.

4. A control apparatus for a hybrid vehicle according to claim 3, wherein the generation amount setting device sets the amount of generation, depending on the degree of throttle opening, when the vehicle speed exceeds a third threshold value which is higher than the second threshold value and lower than the fourth threshold value.

5. A control apparatus for a hybrid vehicle according to claim 2, further including a fuel supply stopper for repeating stopping of the supply of fuel at a predetermined interval when the vehicle speed reaches a fourth threshold value which is higher than the second threshold value.

6. A control apparatus for a hybrid vehicle according to claim 5, wherein the generation amount setting device sets the amount of generation, depending on the degree of throttle opening, when the vehicle speed exceeds a third threshold value which is higher than the second threshold value and lower than the fourth threshold value.

* * * * *